US012713470B2

(12) United States Patent
Zhang

(10) Patent No.: US 12,713,470 B2
(45) Date of Patent: Aug. 18, 2026

(54) SYSTEMS AND METHODS FOR RECOVERING COLLIDED PACKETS IN A WIRELESS NETWORK AND BLOCK-BASED ERROR CORRECTION

(71) Applicant: Florida State University Research Foundation, Inc., Tallahassee, FL (US)

(72) Inventor: Zhenghao Zhang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 484 days.

(21) Appl. No.: 18/100,457

(22) Filed: Jan. 23, 2023

(65) Prior Publication Data

US 2023/0239935 A1 Jul. 27, 2023

Related U.S. Application Data

(60) Provisional application No. 63/440,490, filed on Jan. 23, 2023, provisional application No. 63/301,587, filed on Jan. 21, 2022.

(51) Int. Cl.
*H04W 74/0833* (2024.01)
*H04W 72/0453* (2023.01)

(52) U.S. Cl.
CPC ... *H04W 74/0841* (2013.01); *H04W 72/0453* (2013.01)

(58) Field of Classification Search
CPC .......... H04W 74/0841; H04W 72/0453; H04L 1/0045; H04L 1/0057; H04L 1/0061; H04L 27/2672; H04L 27/2662; H04L 27/2657
See application file for complete search history.

(56) References Cited

U.S. PATENT DOCUMENTS

2016/0157127 A1* 6/2016 Zeger ...................... H04L 43/16 370/392
2017/0126363 A1* 5/2017 Wang .................... H04L 1/0025
2018/0242361 A1* 8/2018 Pajovic ............... H04L 25/0204

OTHER PUBLICATIONS

3rd Generation Partnership Project (3GPP), TS 36.101: Evolved Universal Terrestrial Radio Access (E-UTRA); User Equipment (UE) Radio Transmission and Reception, Technical Specification Group Radio Access Network, 3GPP Technical Specification. (3GPP TS 36.101 version 18.7.0 Release 18) (Oct. 2024).

(Continued)

*Primary Examiner* — Yu-Wen Chang
(74) *Attorney, Agent, or Firm* — FisherBroyles LLP; Anthony J DoVale

(57) ABSTRACT

Provided are methods and apparatus for recovering collided packets in a wireless network, as well as for implementing block-based error correction techniques. In an example, provided is a method to recover collided packets by (A) assigning a peak of a collided packet to a respective packet by calculating a matching cost, per collided packet, from an amplitude of the peak and a time when the peak occurred, where the matching cost is determined from a combination of per-collided packet parameters including (i) respective estimated symbol boundaries of the collided packets, (ii) respective estimated Carrier Frequency Offsets of the collided packets, and (iii) a peak amplitude history of prior packets received from wireless network nodes, and (B) assigning, based on a respective packet in the collided packets having the parameters producing a lowest matching cost among the calculated matching costs, the peak to the respective packet.

20 Claims, 24 Drawing Sheets

(56) References Cited

OTHER PUBLICATIONS

3rd Generation Partnership Project (3GPP), TS 36.104: Evolved Universal Terrestrial Radio Access (E-UTRA); Base Station (BS) Radio Transmission and Reception, Technical Specification Group Radio Access Network, 3GPP Technical Specification. (3GPP TS 36.104 version 18.6.0 Release 18) (Jan. 2025).
Adafruit Industries, Adafruit Feather MO with RFM95 LoRa Radio, Product Description and Specifications, https://www.adafruit.com/product/3178 (accessed Jan. 29, 2026).
Osama4933, Concurrent Interference Cancellation (CIC) Implementation, GitHub repository, https://github.com/osama4933/CIC (accessed Jan. 29, 2026).
Raghav Rathi, Implementation of TnB, GitHub repository, https://github.com/raghavrathi10/TnB (accessed Jan. 29, 2026).
J. Kadbear, LoRaPHY, GitHub repository, https://github.com/jkadbear/LoRaPHY (accessed Jan. 29, 2026).
LoRa Alliance, LoRaWANR Specification v1.1, LoRa Alliance Technical Specification, Oct. 2017, https://resources.lora-alliance.org/technical-specifications/lorawan-specification-v1-1 (accessed Jan. 29, 2026).
Mathworks, Inc., smoothdata: Smooth Noisy Data, MATLAB Function Documentation, https://www.mathworks.com/help/matlab/ref/smoothdata.html?s tid=srchtitle_support_results_1_smoothdata%3A%2520Smooth %2520Noisy%2520Data (accessed Jan. 29, 2026).
Ettus Research, Usrp B210 Software Defined Radio, Product Description and Specifications, https://www.ettus.com/all-products/ub210-kit/ (accessed Jan. 29, 2026).
B. Al Homssi, K. Dakic, S. Maselli, H. Wolf, S. Kandeepan, and A. Al-Hourani, "IoT Network Design Using Open-Source LoRa Coverage Emulator," IEEE Access, vol. 9, p. 53636-53646, 2021.
A. Balanuta, N. Pereira, S. Kumar, and A. Rowe, "A Cloud-Optimized Link Layer for Low-Power Wide-Area Networks,"'in Proceedings of the 18th Annual International Conference on Mobile Systems, Applications, and Services (MobiSys 2020), Toronto, Canada, pp. 247-259, ACM, 2020.
Q. Chen and J. Wang, "AlignTrack: Push the Limit of LoRa Collision Decoding," in Proceedings of the IEEE 29th International Conference on Network Protocols (ICNP 2021), pp. 1-11, IEEE, 2021.
U. Coutaud, M. Heusse, and B. Tourancheau, "Fragmentation and Forward Error Correction for LoRaWAN Small MTU Networks," in Proceedings of the International Conference on Embedded Wireless Systems and Networks (EWSN 2020), Lyon, France, pp. 289-294, ACM, 2020.
D. Croce, M. Gucciardo, S. Mangione, G. Santaromita, and I. Tinnirello, "Impact of LoRa Imperfect Orthogonality: Analysis of Link-Level Performance," IEEE Communications Letters, vol. 22, No. 4, pp. 796-799, 2018.
R. Eletreby, D. Zhang, S. Kumar, and O. Yagan, "Empowering Low-Power Wide-Area Networks in Urban Settings," in Proceedings of the Acm Sigcomm 2017 Conference, Los Angeles, Ca, USA, Aug. 21-25, 2017, pp. 309-321, ACM, 2017.
T. Elshabrawy and J. Robert, "Evaluation of the BER Performance of LoRa Communication Using BICM Decoding," in Proceedings of the IEEE International Conference on Consumer Electronics (ICCE-Berlin 2019), pp. 162-167, IEEE, 2019.
S. Elzeiny, P. Edward, and T. Elshabrawy, "LoRa Performance Enhancement Through List Decoding Technique," in Proceedings of the IEEE International Conference on Communications Workshops (ICC Workshops 2021), pp. 1-6, IEEE, 2021.
B. Hu, Z. Yin, S. Wang, Z. Xu, and T. He, "SCLoRa: Leveraging Multi-Dimensionality in Decoding Collided LoRa Transmissions," in Proceedings of the IEEE 28th International Conference on Network Protocols (ICNP 2020), pp. 1-11, IEEE, 2020.
P. J. Marcelis, N. Kouvelas, V. S. Rao, and R. Venkatesha Prasad, "DARE: Data Recovery Through Application-Layer Coding for LoRaWAN," IEEE Transactions on Mobile Computing, vol. 21, No. 3, pp. 895-910, 2022.
M. O. Shahid, M. Philipose, K. Chintalapudi, S. Banerjee, and B. Krishnaswamy, "Concurrent Interference Cancellation: Decoding Multi-Packet Collisions in LoRa," in Proceedings of the Acm Sigcomm 2021 Conference, Virtual Event, USA, Aug. 23-27, 2021, pp. 503-515, ACM, 2021, DOI: 10.1145/3452296.3472931.
C. Shao, O. Muta, W. Wang, and W. Lee, "Toward Ubiquitous Connectivity via LoRaWAN: An Overview of Signal Collision Resolving Solutions," IEEE Internet of Things Magazine, vol. 4, No. 4, pp. 114-119, 2021.
S. Tong, J. Wang, and Y. Liu, "Combating Packet Collisions Using Non-Stationary Signal Scaling in LPWANs," in Proceedings of the 18th Annual International Conference on Mobile Systems, Applications, and Services (MobiSys 2020), Toronto, Canada, pp. 234-246, ACM, 2020.
S. Tong, Z. Xu, and J. Wang, "CoLoRa: Enabling Multi-Packet Reception in LoRa," in Proceedings of the IEEE Conference on Computer Communications (INFOCOM 2020), Toronto, ON, Canada, Jul. 6-9, 2020, pp. 2303-2311, IEEE, 2020.
X. Wang, L. Kong, L. He, and G. Chen, "mLoRa: A Multi-Packet Reception Protocol in LoRa Networks," in Proceedings of the IEEE 27th International Conference on Network Protocols (ICNP 2019), pp. 1-11, IEEE, 2019.
M. Xhonneux, O. Afisiadis, D. Bol, and J. Louveaux, "A Low-Complexity LoRa Synchronization Algorithm Robust to Sampling Time Offsets," IEEE Internet of Things Journal, vol. 9, No. 5, pp. 3756-3769, 2022.
X. Xia, N. Hou, and Y. Zheng, "PCube: Scaling LoRa Concurrent Transmissions With Reception Diversities," in Proceedings of the ACM International Conference on Mobile Computing and Networking (MobiCom 2021), ACM, 2021.
X. Xia, Y. Zheng, and T. Gu, "FTrack: Parallel Decoding for LoRa Transmissions," IEEE/ACM Transactions on Networking, vol. 28, No. 6, pp. 2573-2586, 2020.
Z. Xu, P. Xie, and J. Wang, "Pyramid: Real-Time LoRa Collision Decoding With Peak Tracking," in Proceedings of the IEEE Infocom 2021 Conference, pp. 1-9, IEEE, 2021.
N. Yoder, peakfinder(x0, sel, thresh, extrema, includeendpoints, interpolate), MATLAB Central File Exchange, https://www.mathworks.com/matlabcentral/fileexchange/25500 (accessed Jan. 29, 2026).
LoRa Alliance, LoRa Alliance Website, https://lora-alliance.org/ (accessed Jan. 29, 2026).

* cited by examiner

100
Time-Domain Signal
After De-chirp
Signal Vector
1
0
-1
5
0
50 100 150 200 250
Original
With timing error
With CFO error

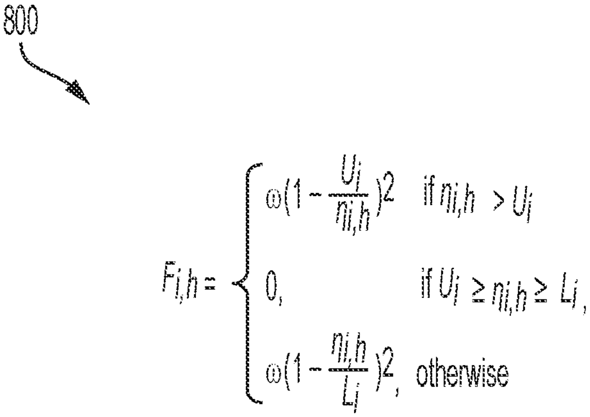

$$F_{i,h} = \begin{cases} \omega(1 - \frac{U_i}{\eta_{i,h}})^2 & \text{if } \eta_{i,h} > U_i \\ 0, & \text{if } U_i \geq \eta_{i,h} \geq L_i, \\ \omega(1 - \frac{\eta_{i,h}}{L_i})^2, & \text{otherwise} \end{cases}$$

FIG. 8

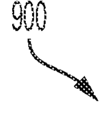

TABLE 1
Decoding Capability Comparison

| CR | Default Decoder | BEC |
|---|---|---|
| 1 | Detects 1-bit error | Corrects 1-symbol error |
| 2 | Detects 1-bit error | Corrects 1-symbol error |
| 3 | Corrects 1-bit error | Corrects 1-symbol error and almost all 2-symbol errors |
| 4 | Corrects 1-bit error | Corrects 1 and 2-symbol errors and over 96% of 3-symbol errors |

FIG. 9

TABLE 2
Summary Of BEC

| CR | # of Err. Columns | Approx. Err. Prob. | Repair Complexity | # of CRC |
|---|---|---|---|---|
| 1 | 1 | 0 | $5\Delta'$ | 5 |
| 2 | 1 | 0 | $2\Delta_1$ | 2 |
| 3 | 1 | 0 | NA | NA |
| | 2 | $2^{-SF}$ | $3\Delta_1$ | 3 |
| 4 | 1 | 0 | NA | NA |
| | 2 | 0 | $\leq 4\Delta_3$ | $\leq 4$ |
| | 3 | $\leq 0.04$ | $\leq 9\Delta_1$ | 4 |

1500

TABLE 3
Experiment Parameters

| | |
|---|---|
| Carrier Frequency | 915 MHz |
| Bandwidth | 125 kHz |
| Over-Sampling Factor (OSF) | 8 |
| Packet Size | 16 bytes |
| Duration | 30 seconds |
| SF | 8, 10 |
| CR | 1, 2, 3, 4 |

FIG.15

SYSTEMS AND METHODS FOR RECOVERING COLLIDED PACKETS IN A WIRELESS NETWORK AND BLOCK-BASED ERROR CORRECTION

CROSS-REFERENCE TO RELATED APPLICATION

This application claims the benefits of U.S. Provisional Patent Application No. 63/440,490, titled "TnB: Resolving Collisions in LoRa based on the Peak Matching Cost and Block Error Correction", filed Jan. 23, 2023 and U.S. Provisional Patent Application No. 63/301,587, titled "TnB: Supporting LoRa under Collision and Challenging Channel Conditions with Novel Peak Identification and Block-based Error Correction", filed Jan. 21, 2022, the disclosures of which are incorporated herein by reference in their entireties.

STATEMENT REGARDING FEDERALLY SPONSORED RESEARCH

This invention was made with United States Government support under Grant No. 1910268 awarded by the United States National Science Foundation (NSF). The United States Government has certain rights in the inventions.

FIELD OF DISCLOSURE

This disclosure relates generally to the technical field of electronics, and more specifically, but not exclusively, to methods and apparatus that recover collided packets in a wireless network, perform block-based error correction, or both.

BACKGROUND

Long-Range Radio (LoRa) has emerged as one of the main candidates for connecting low-power wireless Internet of Things (IoT) devices via Low-Power Wide-Area Networks (LPWANs). In LPWANs, a large number of wireless network nodes connect wirelessly to a gateway device, such as a wireless base station, over long distances with wireless links. Packet collisions occur in LoRa networks when multiple nodes transmit wireless signals simultaneously. Accordingly, there are previously unaddressed and long-felt industry needs for methods and apparatus which improve upon conventional methods and apparatus.

SUMMARY

This summary provides a basic understanding of some aspects of the present teachings. This summary is not exhaustive in detail, and is neither intended to identify all critical features, nor intended to limit the scope of the claims.

Example methods and apparatus for recovering collided packets in a wireless network and performing block-based error correction are provided. In an example, provided is a method for recovering collided packets in a wireless network. The method can include detecting, by a wireless network base station, the collided packets. The collided packets can be received from respective wireless network nodes. The collided packets can have respective signal vectors. The respective signal vectors can have respective peaks that are interleaved as a result of the collision. The collided packets can include respective contiguous symbols having respective symbol boundaries. The method can further include calculating respective estimated symbol boundaries of the collided packets, identifying respective carrier frequency offsets (CFO) of the collided packets, and adjusting the respective signal vectors of the collided packets by: (i) aligning the collided packets in time to the respective estimated symbol boundaries, and (ii) correcting the respective CFOs of the collided packets to respective estimated CFOs. The method can further include finding peaks in the combined signal vectors of the collided packets and assigning, by the wireless network base station, a specific peak found in the respective peaks of the adjusted signal vectors to a respective specific packet in the collided packets. The assigning can include calculating a matching cost, per-collided packet, from an amplitude of the specific peak and a time when the specific peak occurred, where the matching cost is determined from a combination of per-collided packet parameters including: (i) respective estimated symbol boundaries of the collided packets, (ii) the respective estimated CFOs of the collided packets, and (iii) a peak amplitude history of prior packets received from the respective wireless network nodes. The method can further include assigning, based on a respective specific packet in the collided packets having the parameters producing a lowest matching cost among the calculated matching costs, the specific peak to the respective specific packet.

In some examples, the method can further include iteratively performing the assigning step for peaks in the combined signal vectors of the collided packets to produce recovered packets from the collided packets.

In some examples, the method can further include decoding, using block-based error correction, a recovered packet in the recovered packets by: (i) decoding respective physical layer headers of the recovered packets to identify a parameter of respective payloads, where the parameter includes a coding rate, (ii) producing, using a default decoder, a cleaned block by replacing each row of a received block in the recovered packet with a codeword having a minimum Hamming distance, (iii) determining a presence of two or more error columns in the received block in the recovered packet by identifying a difference between the received block and the cleaned block, and (iv) correcting the two or more error columns by: (a) masking at least of the one error columns, (b) generating candidate fixed blocks for combinations of the two or more error columns by replacing each row in the received block with a respective codeword that matches bits in the non-masked columns, and (c) performing a packet-level Cyclic Redundancy Check (CRC) on the candidate fixed blocks to identify the correct candidate fixed block, where the packet-level CRC identifies the correct candidate fixed block with a CRC pass.

In some examples, the block-based error correction can be performed following identifying all symbols in a physical layer header of the recovered packet.

In some embodiments, the method can further include masking, prior to the assigning step, a known respective peak in the collided packets that is: (i) in a preamble of a respective collided packet, (ii) known to be in a packet that is correctly decoded, or (iii) both.

In some examples, the method can further include determining the peak amplitude history by measuring a deviation of an amplitude of the specific peak from an expected peak amplitude for a specific wireless network node, where the expected peak amplitude for the specific wireless network node is determined by curve-fitting historical data indicating changes to historical peaks for the specific wireless network node.

In some embodiments, the wireless network can be a low-power wide area network (LPWAN).

In another example, provided is a wireless network base station configured to recover collided packets in a wireless network. The wireless network base station can include: (i) a tangible processor and (ii) a tangible memory storing processor-executable instructions that, when executed by the tangible processor, cause the tangible processor to detect, by the wireless network base station, the collided packets. The collided packets can be received from respective wireless network nodes. The collided packets can have respective signal vectors. The respective signal vectors can have respective peaks that are interleaved as a result of the collision. The collided packets can include respective contiguous symbols having respective symbol boundaries. The processor-executable instructions can further cause the tangible processor to calculate respective estimated symbol boundaries of the collided packets, identify respective carrier frequency offsets (CFO) of the collided packets, and adjust the respective signal vectors of the collided packets by: (i) aligning the collided packets in time to the respective estimated symbol boundaries, and (ii) correcting the respective CFOs of the collided packets to respective estimated CFOs. The processor-executable instructions can further cause the tangible processor to find peaks in the combined signal vectors of the collided packets and assign a specific peak found in the respective peaks of the adjusted signal vectors to a respective specific packet in the collided packets. The assigning can include calculating a matching cost, per-collided packet, from an amplitude of the specific peak and a time when the specific peak occurred, where the matching cost is determined from a combination of per-collided packet parameters including: (i) respective estimated symbol boundaries of the collided packets, (ii) the respective estimated CFOs of the collided packets, and (iii) a peak amplitude history of prior packets received from the respective wireless network nodes. The processor-executable instructions can further cause the tangible processor to assign, based on a respective specific packet in the collided packets having the parameters producing a lowest matching cost among the calculated matching costs, the specific peak to the respective specific packet.

In some examples, the processor-executable instructions can be further configured to cause the processor to iteratively perform the assigning step for peaks in the combined signal vectors of the collided packets to produce recovered packets from the collided packets.

In some examples, the processor-executable instructions can be further configured to cause the processor to decode, using block-based error correction, a recovered packet in the recovered packets by: (i) decoding respective physical layer headers of the recovered packets to identify a parameter of respective payloads, where the parameter includes a coding rate, (ii) producing, using a default decoder, a cleaned block by replacing each row of a received block in the recovered packet with a codeword having a minimum Hamming distance, and (iii) determining a presence of two or more error columns in the received block in the recovered packet by identifying a difference between the received block and the cleaned block. The processor-executable instructions can be further configured to correct the two or more error columns by: (i) masking at least of the one error columns, (ii) generating candidate fixed blocks for combinations of the two or more error columns by replacing each row in the received block with a respective codeword that matches bits in the non-masked columns, and (iii) performing a packet-level Cyclic Redundancy Check (CRC) on the candidate fixed blocks to identify the correct candidate fixed block, where the packet-level CRC identifies the correct candidate fixed block with a CRC pass.

In some examples, the block-based error correction can be performed following identifying all symbols in a physical layer header of the recovered packet.

In some examples, the processor-executable instructions can be further configured to cause the processor to mask, prior to the assigning step, a known respective peak in the collided packets that is: (i) in a preamble of a respective collided packet, (ii) known to be in a packet that is correctly decoded, or (iii) both.

In some examples, the processor-executable instructions can be further configured to cause the processor to determine the peak amplitude history by measuring a deviation of an amplitude of the specific peak from an expected peak amplitude for a specific wireless network node, where the expected peak amplitude for the specific wireless network node is determined by curve-fitting historical data indicating changes to historical peaks for the specific wireless network node.

In some examples, the wireless network can be a low-power wide area network (LPWAN).

In another example, provided is a non-transitory computer-readable medium, comprising processor-executable instructions stored thereon. The processor-executable instructions are configured to cause a processor to detect, by a wireless network base station, collided packets. The collided packets can be received from respective wireless network nodes. The collided packets can have respective signal vectors. The respective signal vectors can have respective peaks that are interleaved as a result of the collision. The collided packets can include respective contiguous symbols having respective symbol boundaries. The processor-executable instructions can be configured to further cause the processor to calculate respective estimated symbol boundaries of the collided packets, identify respective carrier frequency offsets (CFO) of the collided packets, and adjust the respective signal vectors of the collided packets by: (i) aligning the collided packets in time to the respective estimated symbol boundaries, and (ii) correcting the respective CFOs of the collided packets to respective estimated CFOs. The processor-executable instructions can be configured to further cause the processor to find peaks in the combined signal vectors of the collided packets and assign a specific peak found in the respective peaks of the adjusted signal vectors to a respective specific packet in the collided packets. The assigning can include calculating a matching cost, per-collided packet, from an amplitude of the specific peak and a time when the specific peak occurred, where the matching cost is determined from a combination of per-collided packet parameters including: (i) respective estimated symbol boundaries of the collided packets, (ii) the respective estimated CFOs of the collided packets, and (iii) a peak amplitude history of prior packets received from the respective wireless network nodes. The processor-executable instructions can be configured to further cause the processor to assign, based on a respective specific packet in the collided packets having the parameters producing a lowest matching cost among the calculated matching costs, the specific peak to the respective specific packet.

In some examples, the processor-executable instructions can be further configured to cause the processor to iteratively perform the assigning step for peaks in the combined signal vectors of the collided packets to produce recovered packets from the collided packets.

In some examples, the processor-executable instructions can be further configured to cause the processor to decode, using block-based error correction, a recovered packet in the recovered packets by: (i) decoding respective physical layer headers of the recovered packets to identify a parameter of respective payloads, where the parameter includes a coding rate, (ii) producing, using a default decoder, a cleaned block by replacing each row of a received block in the recovered packet with a codeword having a minimum Hamming distance, and (iii) determining a presence of two or more error columns in the received block in the recovered packet by identifying a difference between the received block and the cleaned block. The processor-executable instructions can be further configured to correct the two or more error columns by: (i) masking at least of the one error columns, (ii) generating candidate fixed blocks for combinations of the two or more error columns by replacing each row in the received block with a respective codeword that matches bits in the non-masked columns, and (iii) performing a packet-level Cyclic Redundancy Check (CRC) on the candidate fixed blocks to identify the correct candidate fixed block, where the packet-level CRC identifies the correct candidate fixed block with a CRC pass.

In some examples, the block-based error correction can be performed following identifying all symbols in a physical layer header of the recovered packet.

In some examples, the processor-executable instructions can be further configured to cause the processor to mask, prior to the assigning step, a known respective peak in the collided packets that is: (i) in a preamble of a respective collided packet, (ii) known to be in a packet that is correctly decoded, or (iii) both.

In some examples, the processor-executable instructions can be further configured to cause the processor to determine the peak amplitude history by measuring a deviation of an amplitude of the specific peak from an expected peak amplitude for a specific wireless network node, where the expected peak amplitude for the specific wireless network node is determined by curve-fitting historical data indicating changes to historical peaks for the specific wireless network node.

In some examples, the wireless network can be a low-power wide area network (LPWAN).

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings are presented to describe examples of the present teachings, and are not limiting.

FIG. 8 depicts an example equation for determining history cost.

FIG. 9 depicts an example decoding capability comparison.

FIG. 15 depicts example experiment parameters.

Figures 1A, 1B, 1C:
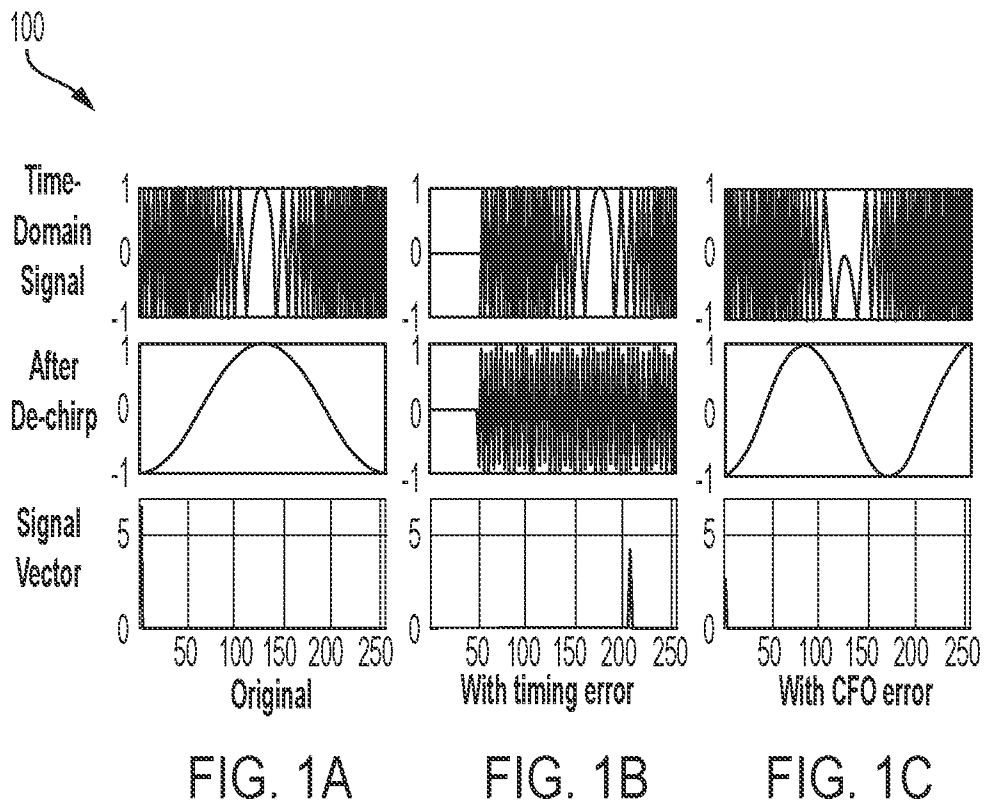
FIGS. 1A-1C depict example (a) Modulation and demodulation of a LoRa symbol, (b) Sensitivity of a peak height to timing error, and (c) Sensitivity of the peak height to a Carrier Frequency Offset (CFO).

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Provided are methods and apparatuses for recovering collided packets in a wireless network and performing block-based error correction.

In examples, the provided packet recovery techniques, also referred to herein as "Thrive," determine actual transmitters of peaks in received signal vectors. The provided packet recovery techniques can be based on the fact that a peak that is processed with parameters and peak history information corresponding to the actual transmitter of the peak result in a highest value result, relative to results produced by processing the peak with parameters and peak history information corresponding to other transmitters. Block-based Error Correction (BEC) decodes exactly the same Hamming code in LoRa, but is capable of correcting many more errors than the default decoder, because BEC jointly decodes multiple codewords in the same block. Herein, Thrive and BEC in combination are referred to as "TnB." TnB has been extensively tested with both real-world experimental traces and simulations, and the results show that TnB significantly outperforms conventional techniques. When implemented, TnB may not require any modifying the LoRa nodes and can bring immediate benefits to a network operator.

The examples disclosed hereby advantageously address the long-felt industry needs, as well as other previously unidentified needs, and mitigate shortcomings of conventional techniques. An advantage provided by the examples is an improvement in a number of packets that can be recovered following collisions, relative to other de-colliding techniques. Among other advantages, an advantage provided by the examples is an improvement in a number of errors corrected, relative to other error correction techniques. The systems and methods described herein can improve the functioning of devices configured to recover collided packets in a wireless network. The systems and methods described herein can improve the functioning of devices configured to perform block-based error correction.

Numerous examples are disclosed in this application's text and drawings. Alternate examples can be devised without departing from the scope of this disclosure. Additionally, conventional elements of the current teachings may not be described in detail, or may be omitted, to avoid obscuring aspects of the current teachings.

This description provides, with reference to FIGS. 1-28, detailed descriptions of example methods and example apparatus for recovering collided packets and performing block-based error correction.

LoRa has emerged as a strong candidate for Low-Power Wide-Area Networks (LPWAN), where a large number of nodes connect to a gateway over long distances with wireless links. In LoRa, nodes may transmit packets at the same time, causing collisions. There have been increasing interests in enhancing LoRa by decoding collided packets, which have achieved significant gains over the original LoRa.

TnB is a novel solution to decode collided LoRa packets. Two main components of TnB are Thrive and Block Error Correction (BEC). When a collision occurs, the received signal contains multiple peaks, where each peak is generated by a node. In order to decode the collided packets, the LoRa receiver should find the owner of each peak, where the owner refers to the node that transmitted the peak. Thrive is a simple yet effective algorithm for finding the owners of the observed peaks. In LoRa, the Hamming Code is used for Forward Error Correction, which is simple but offers only limited error correction capabilities. For example, with Coding Rate (CR) 4, the Hamming code has 4 data bits and 4 parity bits per codeword, and the default decoder can correct only 1-bit errors. BEC is an algorithm for decoding the same Hamming code in LoRa but can correct more errors than the default decoder. For example, with CR 4, BEC can correct all 1-symbol and 2-symbol errors, and even over 96% of 3-symbol errors. Thrive and BEC do not need any modification of the LoRa nodes, allowing a network operator to simply replace the gateway and enjoy immediate performance improvements. The computation complexity of Thrive and BEC are both moderate. TnB has been tested with experimental traces collected with commodity LoRa devices, and the results show that TnB can increase the median throughput by 1.36× and 2.46× over the state-of-the-art for Spreading Factors (SF) 8 and 10, respectively. Additional evaluation with simulations show that TnB achieves even higher gains when the wireless channel is more challenging with stronger multi-path and higher fluctuations.

Thrive is based on the well-known fact that a peak thrives, i.e., is the highest, when the signal is processed with the specific parameters of the owner of the peak. Thrive jointly considers three features that can distinguish a node from others, namely, the symbol boundary, the Carrier Frequency Offset (CFO), and the height of other peaks observed from the same node, and therefore is more effective than those consider only a subset of the features. Thrive can calculate a matching cost that extracts the information embedded in these features based only on the height of the peaks, therefore enjoying a low computation complexity. BEC corrects more errors than the default decoder by exploiting a special dependency of the codewords in LoRa. That is, a demodulation error will lead to errors in multiple codewords at the same location. BEC can decode such codewords jointly, which allows BEC to achieve an error correction capability beyond the traditional bound based on the minimum Hamming distance of the codewords.

LoRa packet collision resolution has attracted increasing interest in recent years. For example, Choir distinguishes peaks from different nodes by the fraction CFOs, which likely lead to unique fractional peak locations. mLoRa leverages the time offset of the transmitted packets and successively recovers and subtracts the collision-free signal. FTrack detects the interfering chirp from the discontinuity of the frequency track. CoLoRa is based on the fact that a misaligned chirp generates peaks at the same location in two consecutive symbols, where the peak height ratio of the two peaks is proportional to the amount of misalignment. Nscale processes the received signal with a modified downchirp, which leads to different effects on the peaks from different nodes. SCLoRa distinguishes the peaks based on the power of the peaks and the change of the peaks when the processing window slides to the left or the right. Pyramid is based on the observation that the peak height of a node increases then decreases when the signal is processed with a sliding window, where the highest height is achieved when the window matches the actual symbol. AlignTrack is based on a similar observation but processes the signal with the symbol boundaries of the detected packets. PCube identifies the signals from different nodes in the spatial domain with multiple antennas. CIC cancels the interference and leaves only the target peak.

In examples, TnB is significantly different from the work listed above in multiple aspects. First, TnB assigns peaks to the nodes by calculating a matching cost based on multiple unique features of the node, namely, the symbol boundary, the CFO, and the peak height history, while the existing work exploits only a subset of the features. Second, TnB makes a unique contribution in the error correction decoding of LoRa. Third, the peak assignment algorithm in TnB is very simple and does not involve costly computations or a large number of antennas.

There have been other attempts to improve LoRa. For example, OPR exploits multiple gateways to recover a lost packet, while TnB runs at a single gateway. In some examples, BICM Decoding and List Decoding can enhance the error correction of LoRa; however, they are designed for single-node transmissions and cannot be applied to signals with collisions because strong signals are processed first which could be from other nodes. TnB is designed for unmodified LoRa nodes and is therefore different from those add own application layer codes.

FIGS. 1A-1C depict examples 100 of (a) Modulation and demodulation of a LoRa symbol, (b) Sensitivity of the peak height to timing error, and (c) Sensitivity of the peak height to CFO.

In some examples, the LoRa Spreading Factor (SF) can be an integer that can be from 6 to 12. The upchirp, denoted by C, is a complex vector of length 2SF with unit amplitude but linearly increasing frequency. The conjugate of C is denoted as C' and is called the downchirp. A LoRa packet consists of LoRa symbols transmitted back-to-back, where a symbol is a cyclically shifted version of C. For example, the top of FIG. 1A shows the real part of a symbol with SF 8, which is C shifted by one location. A symbol modulates SF bits of data, because C can be shifted by h locations where $h \in [0, 2SF-1]$.

At the receiver, a received symbol is denoted as $\beta$, which is also a complex vector of length 2SF. The receiver first de-chirps $\beta$ by computing $\gamma=\beta \odot C'$, where $\odot$ denotes the element-wise multiplication of two vectors. If the transmitted symbol shifts C by h locations, $\gamma$ is a sinusoid that completes h cycles in the symbol time, as shown in the middle of FIG. 1A. The signal vector, denoted as Y, is defined as $Y=|FFT(\gamma)| \odot |FFT(\gamma)|$, which is a vector with a peak at location h, as shown at the bottom of FIG. 1A. The receiver can therefore infer the value of the transmitted data. When there are multiple receiving antennas, the signal vector is the summation of the individual signal vectors of all antennas.

To demodulate a symbol, the receiver needs to find the correct symbol boundary, which refers to the start of the symbol, and cancel the CFO. The peak height can be reduced with a mismatching symbol boundary and residual CFO. A case with misaligned symbol boundary is shown in FIG. 1B, where, as only part of the symbol is used in the calculation, the peak is noticeably lower. A case with residual CFO is shown in FIG. 1C, where the residual CFO leads to an additional 0.5 cycles in $\gamma$ and a much lower peak.

At the sender, the data from the upper layer is encoded by an (8,4) Hamming code, followed by procedures such as whitening. At the receiver, the reverse process is applied to the demodulated bits, including de-whitening and error correction.

Figure 2:
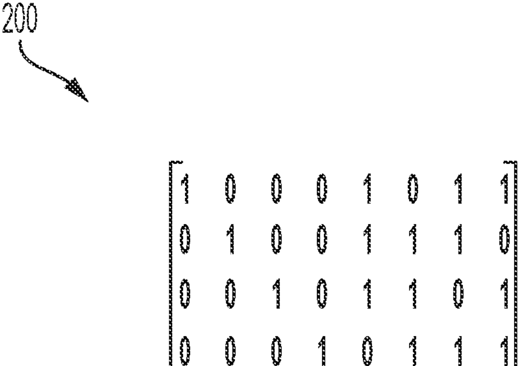
FIG. 2 depicts an example generator matrix of Hamming code.

FIG. 2 depicts an example generator matrix 200 of the Hamming code. A codeword can be generated by multiplying the data, which is a 1 by 4 binary vector, with the generator matrix 200. A complete codeword is a 1 by 8 binary vector, where the first 4 bits are the data bits and the remaining bits are the parity bits. The Coding Rate (CR) is an integer between 1 and 4 and is the number of parity bits transmitted per codeword. If the CR is between 2 and 4, the first CR parity bits are transmitted. An exception is when the CR is 1, in which case the parity bit is the checksum of the 4 data bits. For example, if the data is '1001,' the complete codeword is '10011100', which is the summation of rows 1 and 4 of the generator matrix. If the CR is 3, the transmitted codeword is '1001110.' The Hamming code guarantees detecting t−1 errors if the minimum Hamming distance between the codewords is t, and correcting t errors if the minimum Hamming distance is 2t+1. Therefore, CR 1 and CR 2 offer 1-bit error detection, while CR 3 and CR 4 offer 1-bit error correction.

Figures 3A, 3B, 3C:
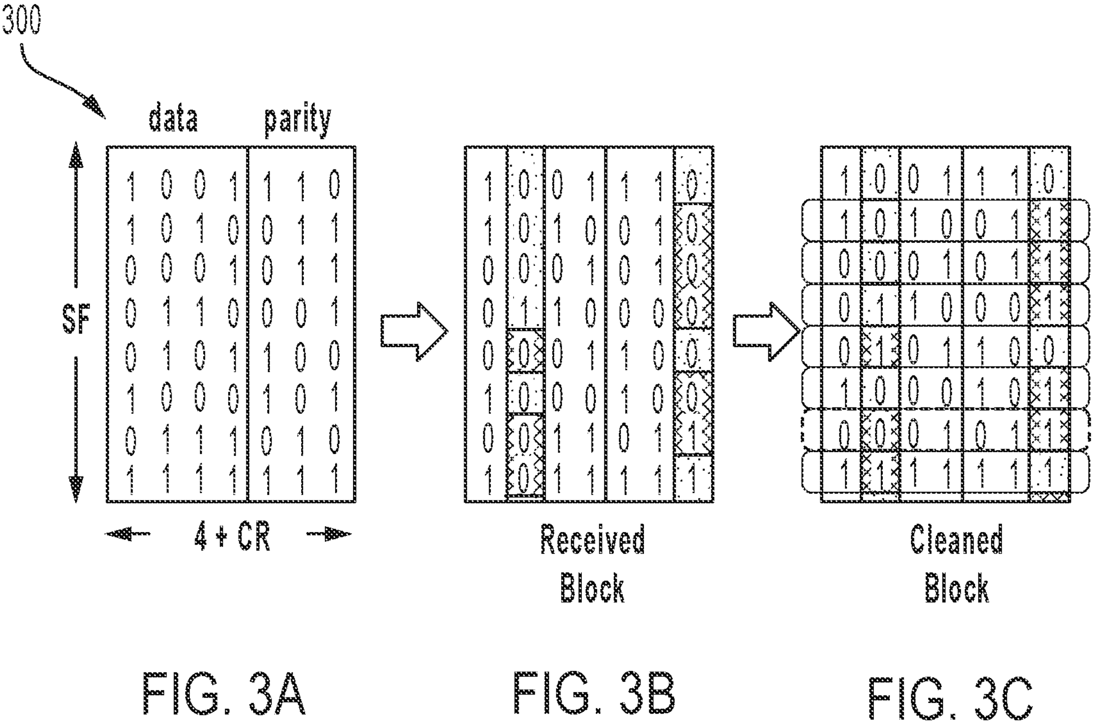
FIGS. 3A-3C depict an example code block in LoRa with a spreading factor of eight and a coding rate of three.

FIGS. 3A-3C depict an example code block in LoRa 300 with a spreading factor of eight and a coding rate of three. In FIG. 3B, bits marked with a cross-hatched background have errors (e.g., due to a collision). In FIG. 3B, bits marked with either the cross-hatched background or a dotted background are in received symbols that have errors. The hatched background or a dotted background are carried over to FIG. 3C for ease of comparing FIGS. 3A-3C.

LoRa organizes the codewords in blocks, where each block is a SF by 4+CR binary matrix. In a block, each row is a codeword and each column contains the bits to be transmitted by one symbol. As an example, a code block is shown FIG. 3A, where the SF is 8 and the CR is 3. Let the received block be the block received by the receiver, potentially with some symbols corrupted. FIG. 3B shows the received block, where symbols 2 and 7 have been corrupted. As the error values are random, a corrupted symbol usually does not flip all bits in a column. The default decoder replaces each row of the received block with a codeword that is closest to the row, i.e., with the minimum Hamming distance, producing the cleaned block. FIG. 3C shows the cleaned block, where, in all rows except row 7, the number of errors are 1 or 0, which can be corrected by the default decoder. Row 7 however has 2 errors, which is beyond the error correction capability of the Hamming code. The default decoder "snaps" row 7 to the codeword with the minimum Hamming distance, which differs with row 7 in column 3, producing an error. The BEC can decode this block correctly, as is explained herein.

A LoRa packet starts with the preamble, followed by the Physical Layer (PHY) header, then the payload. The preamble allows the receiver to detect the packet, which typically starts with 8 upchirps, followed by 2 symbols called the sync symbols, then 2.25 downchrips. The PHY header consists of 8 symbols and uses CR 4, from which the receiver can learn the CR and the length of the payload.

Overview of TnB

Figure 4:
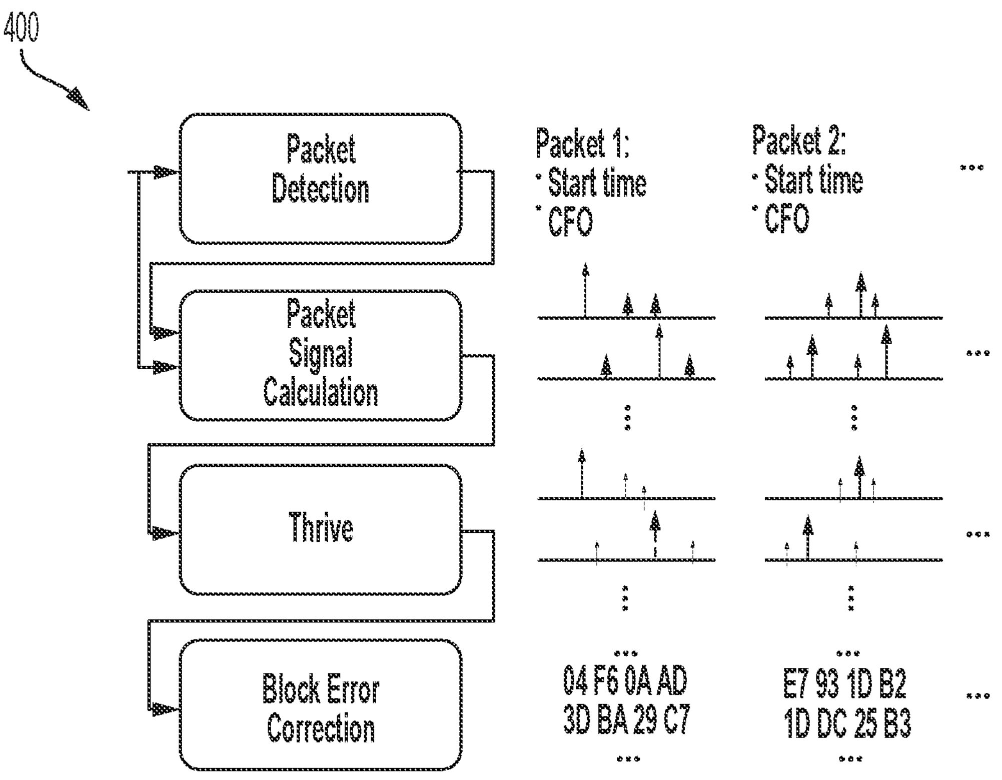
FIG. 4 depicts an overview of an example method for recovering collided packets in a wireless network and performing block-based error correction.

FIG. 4 depicts an example method for recovering collided packets in a wireless network and performing block-based error correction (TnB) 400. The example method for performing TnB 400 can include four components. The first component can be a packet detection component, which takes the received time-domain signal as input and detects packets, at the same time finding the symbol boundary and the CFO of each packet. The second component can be a signal calculation component, which takes the list of detected packets, as well as the time-domain signal, as input, and calculates the signal vectors of each packet, where the signal vectors of a particular packet are calculated by aligning to its estimated symbol boundary and correcting the CFO according to an estimated CFO. The third and fourth components can be Thrive and BEC. Thrive can receive the signal vectors as input, and can assign peaks to the packets. BEC can receive the peak locations of each packet as input, and decode the peak locations into data bits. Thrive and BEC can be jointly used as in TnB, or used separately and combined with other methods, such as combining BEC with CIC.

In some examples, starting from the first sample of the received signal, every $2^{SF}$ samples, which is the length of the symbol, is a checking point. At each checking point, Thrive can examine the symbols that intersect the checking point, and can assign one peak to each symbol. Once the PHY header of a packet has been received, BEC can be called to decode the PHY header to learn the CR and the length of the payload. Once the last symbol of the payload has been received, BEC can be called to decode the payload. Thrive also can reexamine the received signal for a second time to decode packets that failed at the first attempt, because many packets may have been decoded correctly and their peak locations are known and can be masked.

Peak Assignment with Thrive

Thrive can assign peaks to packets when there are multiple peaks in the signal vector.

Figure 5:
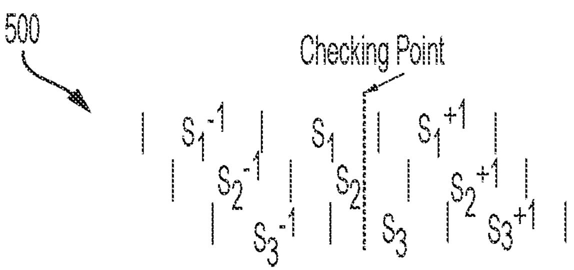
FIG. 5 depicts an example checking point and example symbols.

An example of a checking point 500 is shown in FIG. 5, which intersects 3 symbols denoted as S1, S2, and S3, respectively, where the symbols are sorted according to their boundaries with the first being S1. Symbol i belongs to packet i, which is transmitted by node i. Symbols of packet i right before and after Si are denoted as Si−1 and Si+1, respectively.

Figure 6:
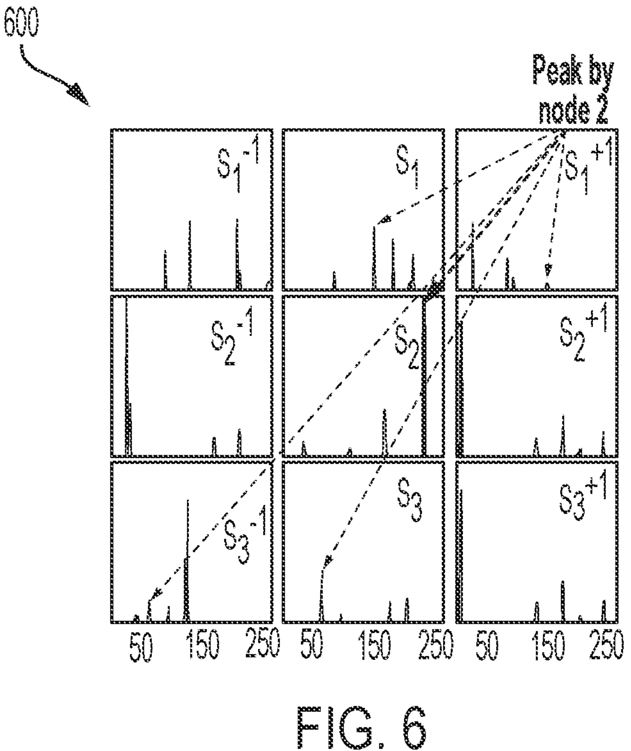
FIG. 6 depicts an example of signal vectors and peaks.

FIG. 6 depicts an example of signal vectors and peaks 600. The challenges of peak assignment can be seen in FIG. 6, which shows the signal vectors of the symbols in FIG. 5. As can be seen in FIG. 6, a signal vector can have multiple peaks, while the packets to which the peaks belong is unclear. The number of peaks in a signal vector is more than the number of wireless network nodes, because the signal from one wireless network node generates a peak not only in its own signal vector, but also in the signal vectors of other wireless network nodes when the symbols overlap. For example, wireless network node 2 can generate a peak in S2. However, as S2 overlaps with S1 and S1+1, the same signal also generates in peaks in the signal vectors of S1 and S1+1, which are at different locations and are of different heights. The same signal also generates peaks in the signal vectors of S−1 and S3.

As mentioned earlier, Thrive jointly considers the symbol boundary, the CFO, and the peak height history. While these features have been exploited to various degrees in the past, combining them further improves the distinguishability of the peaks. The challenge, however, is how to combine them effectively without incurring high computation cost.

In some embodiments, Thrive can be based on a concept that the height of a peak (e.g., an amplitude of the peak) is highly sensitive to the symbol boundary and the CFO, and is also highly correlated with peaks in nearby symbols from the same node. Therefore, reversely, by examining how the peak height varies in the signal vectors of different nodes and how it differs from those in nearby symbols, the packet to which the peak belongs can be identified. As the signal vectors have been found by the packet signal calculation component, no additional heavy computations are needed in Thrive.

To elaborate, first, the peak height is reduced if the signal is processed with incorrect symbol boundary and CFO, as shown in FIG. 1B and FIG. 1C. Therefore, as long as the nodes have different symbol boundaries and CFOs, the signal from a node likely generates the highest peak in its own signal vector, rather than in those of other nodes. To exploit this observation, let siblings refer to the set of peaks in the signal vectors of different nodes generated by the same transmitted symbol. For example, the 5 peaks pointed by the arrows in FIG. 6 are siblings. From the receiver's point of view, as the highest peak among all siblings is in the signal vector of node 2, the peak matches the best with the parameters of node 2, and therefore node 2 is most likely the owner of the peak. The sibling cost of a peak is therefore defined based on its relative height among its siblings. The higher the peak, the lower the cost, and the more likely the node to which the signal vector belongs is the owner of the peak.

Figure 7:
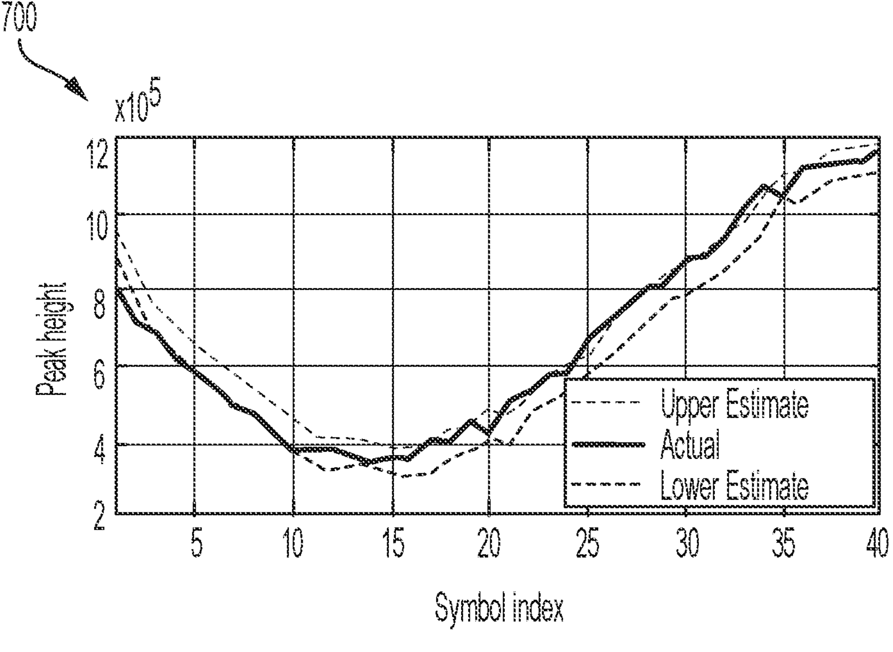
FIG. 7 depicts an example peak height history of a packet, along with upper and lower estimates of peak height.

FIG. 7 depicts an example peak height history 700 of a packet, along with the upper and lower estimates of peak height. The peak height history 700 can be very useful, because the signal powers of the nodes likely differ, resulting in different peak heights; at the same time, the peaks from the same node should bear some similarities. An example is shown in FIG. 7 for a packet, where, although the signal fluctuates, the peak height still follows some trend. The history cost of a peak measures the deviation of the peak from the expected peak height of a node based on the past observations of the node. The smaller the deviation, the lower the cost, and the more likely the node is the owner of the peak. The expected peak height is computed by a curve-fitting algorithm capable of tracking the changes caused by channel fluctuations, bootstrapped by the peaks in the preamble.

Lastly, the sibling cost and the history cost are linearly combined into the matching cost, which represents the likelihood of a node to be the owner of a peak.

Exemplary Details of Thrive are Explained in the Following for a Generic Checking Point.

1. Notations: Let M be the number of symbols intersecting the checking point. Let $\tau_i$ be the time difference between the boundaries of $S_i$ and $S_1$. Let $\delta_i$ be the CFO difference between $S_i$ and $S_1$, where the CFO is measured by the number of cycles the CFO sinewave completes in a symbol. Let $\alpha_i=\tau_i+\delta_i$. For each $1 \le i \le M$, Thrive runs a peak finding algorithm to find the peaks in the signal vector of $S_i$, denoted as $\{P_{i,1}, P_{i,2}, \ldots\}$, where the maximum number of peaks in a symbol is currently 2M. The height of $P_{i,h}$ is denoted as $\eta_{i,h}$. The matching cost of $P_{i,h}$ is the summation of $w_{i,h}$ and $F_{i,h}$, which denote the sibling cost and the history cost, respectively.

2. Identifying the Siblings: A potential challenge is to identify the set of siblings. Fortunately, in LoRa, the following fact holds: if a symbol or part of the symbol overlaps with both $S_i$ and $S_k$ and produces peaks at locations a and b, respectively, $a=\mathrm{mod}\{b+\alpha_i-\alpha_k-1, 2^{SF}\}+1$. Therefore, it is possible to track a peak in all symbols where it may emerge and find its siblings based on the locations of the peaks.

3. Peak Cost Calculation: As shown in FIG. 7, a peak transmitted by node i in symbol $S_i$ may also appear in 2(M−1) symbols, namely, $S_k$ and $S_k^{+1}$ for $1 \le k < i$, and $S_k^{-1}$ and $S_k$ for $M \ge k > i$. Denote the maximum peak height of all siblings of $P_{i,h}$ as H*. In the signal vectors of some nodes, the sibling may be too weak to be identified as a peak; in this case, the height of the sibling is the value of the signal vector at the expected location of the sibling. The sibling cost of $P_{i,h}$ is in equation (1) below:

$$w_{i,h}=\left(1-\frac{\eta_{i,h}}{H^*}\right)^2. \quad (1)$$

To calculate the history cost, let $A_i$ and $D_i$ be the estimated peak height and peak height deviation when processing $S_i$, respectively. Thrives uses a curve-fitting algorithm to fit the height of the peaks that have been observed for packet i so far. $A_i$ is the value of the fitted curve at $S^{-1}$, and $D_i$ is the median of the differences between the actual and fitted data. The upper and lower estimates are $U_i=A_i+4D_i$ and $L_i=\max\{0, A_i-4D_i\}$, respectively, which are shown in FIG. 7, along with the actual height of the peaks.

FIG. 8 depicts an example equation 800 for determining history cost. The history cost of $P_{i,h}$ is depicted by Equation (2) in FIG. 8, where ω is an empirical parameter to control the importance of the history cost. Currently, ω=0.1. As TnB decodes a packet for a second time if the first attempt was not successful, during the second attempt, the curve fitting algorithm runs on all peaks, while Ai is the value of the fitted curve at Si, and Di is the median of the differences between the actual and fitted data.

4. Peak Assignment: Prior to the peak assignment, the known peaks and their siblings are found and masked, where a peak is known if it is in the preamble part of a packet, or if the packet has been decoded correctly. The peak assignment algorithm is a simple heuristic that determines the assignment of a selected symbol in each iteration. In each iteration, it first finds the minimum matching cost of the peaks in all remaining symbols. If there is only one symbol that has a peak with the minimum cost, this symbol is selected; otherwise, the symbol that has the fewest peaks with the minimum cost is selected; if there are still ties, an arbitrary choice is made. The selected symbol is assigned a minimum cost peak, after which the siblings of the peak are masked and the selected symbol removed.

5. Complexity: At a checking point that intersects M symbols, Thrive can run the peak finder and the curve fitting algorithms for at most M times each, as well as running the peak assignment algorithm for at most M iterations, because each symbol is assigned a peak in each iteration and the decisions are never revisited. The peak cost needs to be calculated for at most $2M^2$ peaks, where the calculation for each peak involves finding its siblings and calculating the cost in constant time according to Eq. 1 and Eq. 2.

Block Error Correction (BEC)

BEC is an algorithm that decodes the same Hamming code in LoRa but achieves much higher error correction capabilities than the default decoder, as summarized in Table 1 in FIG. 9. FIG. 9 depicts an example decoding capability comparison 900.

BEC decodes code blocks in LoRa instead of individual codewords, because errors in a block are correlated: a corrupted symbol leads to errors in the same column of the block. BEC examines the differences between the received block and the cleaned block, because the differences are either the true errors, or are related to the true errors. In the following, the core ideas of BEC are explained for CR 3, because other CRs are similar.

Figure 10:
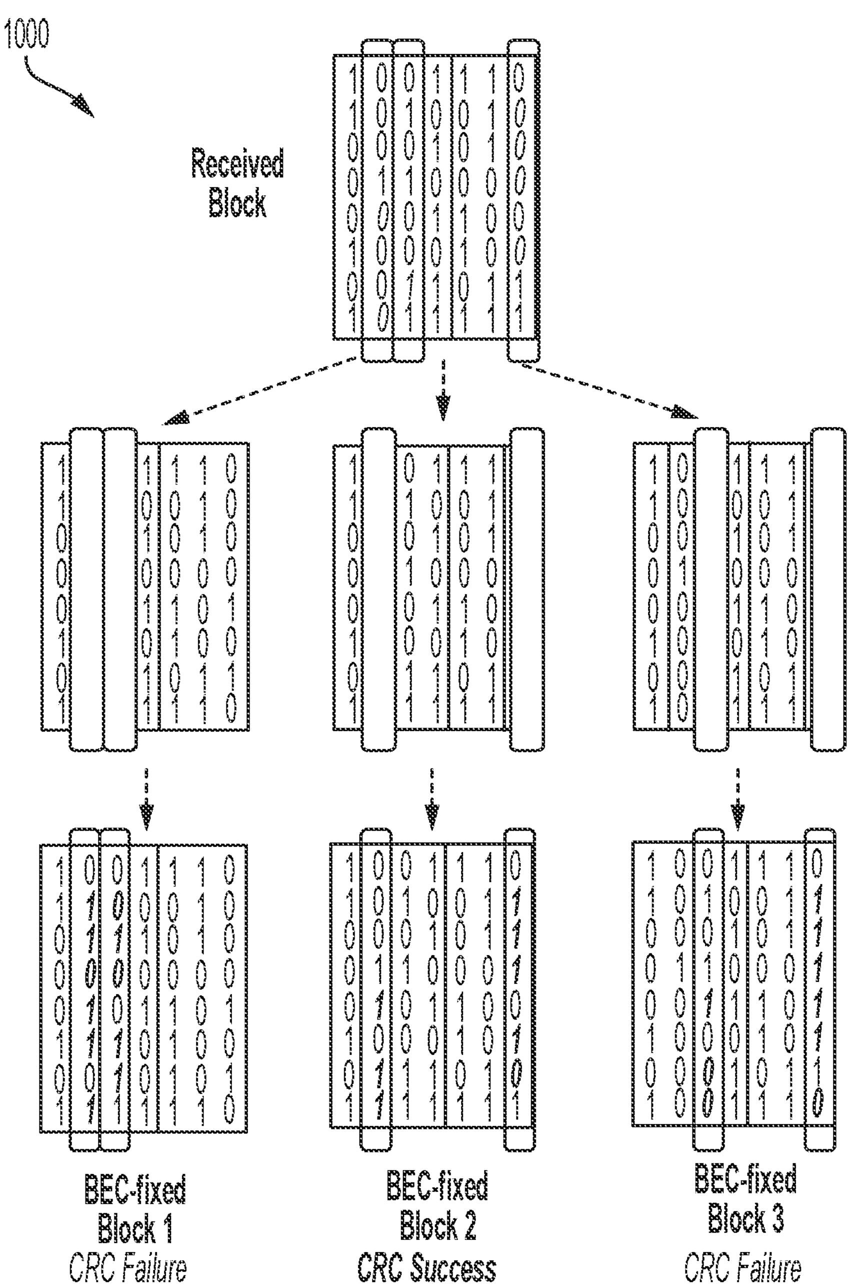
FIG. 10 depicts an example of block-based error correction correcting errors in the example code block depicted in FIG. 3B.

FIG. 10 depicts an example of block-based error correction 1000 correcting errors in the example code block depicted in FIG. 3B, where the differences between the received block and the cleaned block are shown in italics at the top of FIG. 10. As mentioned earlier, due to the randomness of errors, a corrupted symbol rarely flips every bit in the corresponding column. Therefore, even when there are multiple corrupted symbols, there often exist rows with only one error, which is within the error correction capability of the Hamming Code and can be corrected by the default decoder. In FIG. 10, rows 2, 3, 4, 5, 6, and 8 have only one error and the differences between the received block and the cleaned block are either in column 2 or column 7, which are the true error columns.

When the number of errors is beyond the error correction capability of the Hamming code, the default decoder produces a decoding error, which is still mathematically related to the true errors. In FIG. 10, as row 7 has two errors, the default decoder flips the wrong bit in column 3. However, this is not a random action, because the default decoder will always flip the bit in column 3 if there are errors in columns 2 and 7. Therefore, column 3 is referred to as the companion of columns 2 and 7. Fundamentally, this is because a binary vector with '1's only in columns 2, 3 and 7 is a valid codeword. As a result, flipping the bit in column 3 of row 7 also produces a codeword, which is closer to row 7 than that by flipping the bits in columns 2 and 7.

As the differences between the received block and the cleaned block occur in columns 2, 3, and 7, BEC can determine that there must be 2 or more error columns, because otherwise, the default decoder is capable of correcting all errors and the difference shall occur all in the same column. With CR 3, BEC attempts to correct up to 2 error columns. The companion introduces ambiguities, because it is unclear which columns are the true error columns and which is the companion. As column 2 is the companion of columns 3 and 7, and column 7 is the companion of columns 2 and 3, the same situation can be observed if the true error columns are 2 and 3, or 3 and 7. To resolve this ambiguity, BEC generates 3 BEC-fixed blocks as potential solutions. Basically, BEC tests every combination of 2 potential error columns. As shown in FIG. 10, the BEC-fixed block for every combination is obtained by first masking the columns in the received block, then replacing each row with a codeword that matches in the remaining columns. BEC relies on the packet-level Cyclic Redundancy Check (CRC) to identify the correct BEC-fixed block, which should be the only one that leads to a CRC pass.

BEC applies only to packets with a small number of blocks, because the number of CRC calculations grows exponentially with the number of blocks. Fortunately, LoRa packets are typically small: a packet with 16 bytes has only 3 to 5 blocks depending on the SF and CR. Also, it could occur that the differences between the received block and cleaned block do not appear in a true error column. In almost all such cases, the differences occur in one true error column and the companion of the true error columns, so that BEC will still test the actual true error columns as one of the potential solutions and correct the errors.

The following are some of the notations used in BEC:

R: the received block

Γ: the cleaned block $\phi_i$: the set of rows in which R and Γ differ by i bits Ξ: the set columns in which the rows in $\phi_1$ differ between R and Γ

$r_i$: row i of a matrix $c_k$: column k of a matrix

Π: a set of columns

||: the size of a set

V(Π): a binary row vector with the same length of a codeword, where a column is 1 if the column is in Π

In the examples of FIGS. 3A-3B and FIG. 10, $\phi_0=\{r_1\}$, $\phi_1=\{r_2, r_3, r_4, r_5, r_6, r_7, r_8\}$, and $\Xi=\{c_2, c_3, c_7\}$.

For a set of columns $\Pi$ where $|\Pi|$ is less than the minimum Hamming distance of the code, a companion, denoted as $\Pi'$, is defined as the columns, which, when combined with $\Pi$, makes a codeword. That is, $V(\Pi \cup \Pi')$ is a codeword. For example, for the code shown in FIG. 3 and FIG. 10, the companion of $\{c_2, c_7\}$ is $\{c_3\}$. Clearly, $|\Pi|+|\Pi'|$=CR. When there are errors in every column in $\Pi$, if $|\Pi|<|\Pi'|$, the default decoder flips the bits in $\Pi$; if $|\Pi|>|\Pi'|$, the default decoder flips the bits in $\Pi'$ or in other companions of $\Pi$; if $|\Pi|=|\Pi'|$, the choice is arbitrary. $\Pi$ may have one or multiple companions depending on the CR and $|\Pi|$. In particular, when the CR is 4 and $|\Pi|=2$, as explained herein, $\Pi$ has 3 possible companions. In this case, $\Pi$, along with its companions, are called a companion group.

Repair Methods

BEC can employ a number of methods to repair R to produce the BEC-fixed blocks. There can be four repair methods, denoted as $\Delta'$, $\Delta_1$, $\Delta_2$, and $\Delta_3$.

$\Delta'$ applies only to CR 1 and its notation style is slightly different, because CR 1 is a special case. To repair R with a column is to use the checksum of the other 4 columns to replace this column in R.

$\Delta_1$ is used most often and has been shown in FIG. 10. To repair R with a set of columns, say, $\Pi$, BEC first masks these columns. A row in R, say, $R_i$, is repairable, if it matches one of the valid codewords, say, $\vartheta$, in the remaining columns. In this case, to repair $R_i$ is to replace it with $\vartheta$. R is repairable only if every row is repairable.

$\Delta_2$ applies mainly to CR 4 for correcting 2-column errors when $\Xi$ contains one column, say, $c_{k1}$. In this case, BEC assumes $c_{k1}$ is a true error column, and attempts to repair the rows in $\phi_2$. A row in $\phi_2$, say, $R_i$, is repairable, if it differs only in one column, such as $c_{k2}$, with a valid codeword, say, $\vartheta$, after the bit in $c_{k1}$ is flipped. In this case, to repair $R_i$ is to replace it with $\vartheta$. $c_{k2}$ is called the column of mismatch. R is repairable only if all rows in $\phi_2$ are repairable with the same column of mismatch.

$\Delta_3$ applies only to CR 4 for correcting 2-column errors when $\Xi$ is empty. BEC attempts to repair R with two columns, say $c_{k1}$ and $c_{k2}$. A row in $\phi_2$, say $R_i$, is repairable, if it matches a codeword, say, $\vartheta$, after the bits in $c_{k1}$ and $c_{k2}$ are flipped. In this case, to repair $R_i$ is to replace it with $\vartheta$. R is repairable only if all rows in $\phi_2$ are repairable.

The complexity of $\Delta'$ is clearly low because it involves only the calculation of the checksum. Owing to the simplicity of the (8, 4) Hamming code, the complexities of the rest of the repair methods are also low, because the main computation is to compare each modified row with all 16 codewords, where the total number of comparisons is bounded by 16SF.

Decoding CR 1

With CR 1, BEC attempts to correct up to 1-column errors. If the parity check passes in every row, BEC returns, assuming there is no error. Otherwise, BEC attempts to repair R with each column according to $\Delta'$, and produces 5 BEC-fixed blocks, as there are 5 columns in R, Decoding CR 2

With CR 2, a row in R and the corresponding row in $\Gamma$ differ by at most one bit. BEC first examines if $|\Xi|=0$, i.e., R and $\Gamma$ are identical, and if so, BEC returns, assuming there is no error. If $|\Xi|\geq 1$, BEC attempts to decode 1-column errors. If $|\Xi|\geq 3$, there must be more than one error column and BEC returns with decoding failure. If $|\Xi|=1$, BEC first finds the companion of the column in $\Xi$ and adds it to $\Xi$, then applies $\Delta_1$ to repair R with each column in $\Xi$, producing a BEC-fixed block for each if the repair is successful. The same process is applied if $|\Xi|$ is already 2.

Decoding CR 3

With CR 3, a row in R and the corresponding row in $\Gamma$ differ by at most one bit. BEC first examines if $|\Xi|=0$, and if so, BEC returns, assuming there is no error. Otherwise, BEC examines if $|\Xi|=1$, i.e., the differences between R and $\Gamma$ all occur in a single column, and if so, BEC returns, assuming there is only one error column, because the default decoder can correct one-bit errors. If $|\Xi|\geq 2$, BEC attempts to decode 2-column errors. As explained herein, if $|\Xi|\geq 4$, there must be more than two error columns and BEC returns with decoding failure. If $|\Xi|=2$, BEC finds the companion of the two columns in $\Xi$, which is another column, and adds it to $\Xi$. BEC attempts all 3 combinations of two columns in $\Xi$ to repair R with $\Delta_1$, producing a BEC-fixed block in each case if the repair is successful. The same process is applied if $|\Xi|$ is already 3, as shown in FIG. 10.

Decoding CR 4

For CR 4, a row in R and the corresponding row in r differ by at most two bits. Similar to CR 3, BEC returns without further processing if R and r are identical, or if the differences between R and r all occur in a single column. Otherwise, BEC first attempts to decode 2-column errors, and, if fails, 3-column errors.

1. 2-Column Errors: If there are 2 error columns, as explained herein, $|\Xi|\leq 2$. Therefore, BEC attempts to decode 2-column errors only if $|\Xi|\leq 2$. First, if $|\Xi|=0$, which is very rare, for every row in $\phi_2$, say row i, where $R_i$ and $\Gamma_i$ differ in two columns, BEC finds the companion group of the two columns, which contains 4 pairs. If every row in $\phi_2$ yields exactly the same companion group, BEC produces a BEC-fixed block for every pair in the group by using the pair to repair R with $\Delta_3$. If $|\Xi|=1$, let the column in $\Xi$ be $c_k$. BEC attempts to repair R with $\Delta_2$ using $c_k$ and produces one BEC-fixed block if the repair is successful. If $|\Xi|=2$, BEC repairs R with $\Delta_1$ using the two columns and produces one BEC-fixed block if the repair is successful. The attempt to decode 2-column errors fails if no BEC-fixed block is produced.

2. 3-Column Errors: If there are 3 error columns, as explained herein, $|\Xi|\leq 4$. Therefore, BEC attempts to decode 3-column errors only if $|\Xi|\leq 4$. If $|\Xi|=0$, however, BEC returns with decoding failure, because it is beyond the capability of BEC.

If $|\Xi|=1$, suppose the column in $\Xi$ is $c_{k1}$. BEC applies $\Delta_2$ using $c_{k1}$. If there are indeed 3 error columns, based on Lemma 3, there must be either 2 or 3 distinct columns of mismatch for rows in $\phi_2$ after the repair. In the former case, denote the columns as $c_{k2}$ and $c_{k3}$. BEC finds the companion of $c_{k1}$, $c_{k2}$, and $c_{k3}$, denoted as c'. In the latter case, denote the columns as $c_{k2}$, $c_{k3}$, and $c_{k4}$, and based on Lemma 3, $c_{k4}$ must be the companion of $c_{k1}$, $c_{k2}$, and $c_{k3}$; therefore, the two cases are equivalent. BEC attempts to repair R with $\Delta_1$ using all 4 combinations of 3 columns and produces a BEC-fixed block in each case.

If $|\Xi|=2$, BEC first makes 6 attempts to repair R with $\Delta_1$, where in each attempt it uses $\Xi$ along with a column not in $\Xi$. If there are indeed 3 error columns, based on Lemma 1 and Lemma 2, among the 6 attempts, regardless of whether or not the two columns in $\Xi$ are the true error columns or not, there will be exactly 2 attempts that can repair R. Denote the two combinations of columns that can repair R as ($c_{k1}$, $c_{k2}$, $c_{k3}$) and ($c_{k1}$, $c_{k2}$, $c_{k4}$), respectively, where $c_{k1}$ and $c_{k2}$ are in $\Xi$. If $\Xi$ contains two true error columns, one of the two combinations are the true error columns; otherwise, i.e., if $\Xi$ contains the companion of the true error columns, either ($c_{k3}$, $c_{k4}$, $c_{k1}$) or ($c_{k3}$, $c_{k4}$, $c_{k2}$) must be the true error columns.

Therefore, BEC makes two more attempts with $\Delta_1$ using ($c_{k3}$, $c_{k4}$, $c_{k1}$) and ($c_{k3}$, $c_{k4}$, $c_{k2}$), and produces a total of 4 BEC-fixed blocks.

If $|\Xi|=3$, BEC adds the companion of $\Xi$ to $\Xi$, which is another column. BEC then attempts to repair R with $\Delta_1$ using each combination of 3 columns in $\Xi$. If there are indeed 3 error columns, one BEC-fixed block is produced in each attempt. The same repair process is applied if $|\Xi|$ is already 4.

When there are more than 3 error columns, the repair may fail. Even if the repair appears successful, the packet-level CRC will still eventually fail.

Figure 11:
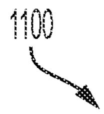
FIG. 11 depicts an example summary of block-based error correction factors.

FIG. 11 depicts an example summary 1100 of block-based error correction factors in Table 2.

Decoding Performance and Complexity

Table 2 summaries the decoding performance of BEC, the proof of which can be found herein. Table 2 also shows the complexity of BEC for decoding one block, where the computation mainly includes applying the repair methods and CRC calculations. The number of CRC calculations for a block is exactly the number of BEC-fixed blocks. The type of the repair method and the number of times it is applied depend on the CR and the number of error columns, which, in most cases, should be clear from the description of the decoding process. With CR 4 and 3 error columns, the bound is $9\Delta_1$, because the highest computation occurs when $|\Xi|=2$, in which case BEC first assumes that there are two error columns and applies $\Delta_1$ once, which will fail, then applies $\Delta_1$ 8 times, assuming there are 3 error columns.

Packet Decoding

A packet is decoded by assembling the BEC-fixed blocks of different blocks into a repaired packet and testing the packet level CRC. To limit the computation complexity, the number of CRC calculations is limited by a parameter denoted as W. If the potential number of repaired packets exceeds W, only W packets are randomly selected and tested. W is currently 125, 16, 16, and 16 when the CR is 1, 2, 3, and 4, respectively. W is higher when the CR is 1, because more BEC-fixed blocks are generated, a price for transmitting less overhead. However, it was found in testing that when the CR is 1, changing W to 25 reduces the number of decoded packets by less than 5%.

Packet Detection

In TnB, packet detection consists of 4 steps, including estimation of the fractional symbol boundary and CFO.

In step 1, TnB detects packets by finding peaks at the same locations in consecutive symbols, which should be generated by the upchirps and the downchirps in the preamble.

In step 2, a preliminary estimate of the start time of a detected preamble is calculated and the preamble is removed if it does not produce peaks at expected locations. For example, if the preamble is detected with the downchirp, the preliminary start time should be selected such that the downchirp peaks are at location 1. Under this constraint, the upchirp peaks should be close to location 1, where the relaxation is determined by the maximum allowable CFO, because the CFO has not been corrected at this point. To avoid errors that are multiples of T, where Tis the length of a symbol, multiple tests are performed with adjustments of −2T, −T, 0, T, and 2T added to the preliminary estimate of the start time. A preamble is discarded only if it fails all 5 tests.

In step 3, coarse timing and CFO estimations are calculated for each detected preamble. That is, let $x_1$ and $x_2$ be the locations of the upchirp peaks and the downchirp peaks, respectively. The preamble start time and the CFO are adjusted by r $\lfloor(x_1-x_2)/2\rceil$ and f$\lfloor(x_1+x_2)/2\rceil$, respectively, where $\lfloor\ \rceil$ denotes rounding a number to the nearest integer, $\tau$ is the sample time, and f=1/T.

In step 4, fractional timing and CFO are estimated, which are fractions of $\tau$ and f, respectively. For simplicity, adjustments of $\delta_t\tau$ and $\delta_f f$ are denoted as $\delta_t$ and $\delta_f$, respectively, where $\delta_t$ and $\theta_f$ are real numbers. Due to challenges caused by collisions, TnB uses a search that evaluates a function for different combinations of $\delta_t$ and $\delta_f$ and selects the combination that achieves the maximum. The search is optimized and evaluates only 36 combinations when U=8, where U denotes the Over-Sampling Factor (OSF), which is the number of samples taken at the receiver between two transmitted samples at the sender.

To be more specific, for a received symbol $\beta$, let the complex signal vector be FFT ($\beta\odot C'$). For any $\delta_f$ and $\delta_t$, let $Q(\delta_t, \delta_f)$ be the total peak energy in the preamble, where the energy is computed by adding the complex signal vectors of the preamble and computing the energy at the peak location in the summation vector. The complex signal is used because it preserves the phase information, so that the summation at the peak location is weak if the fractional CFO is not canceled. Let $Q^*(\delta_t, \delta_f)$ be $Q(\delta_t, \delta_f)$ if both the upchirp peaks and downchirp peaks are at location 1; otherwise, let $Q^*(\delta_t, \delta_f)$ be 0.

Figure 12:
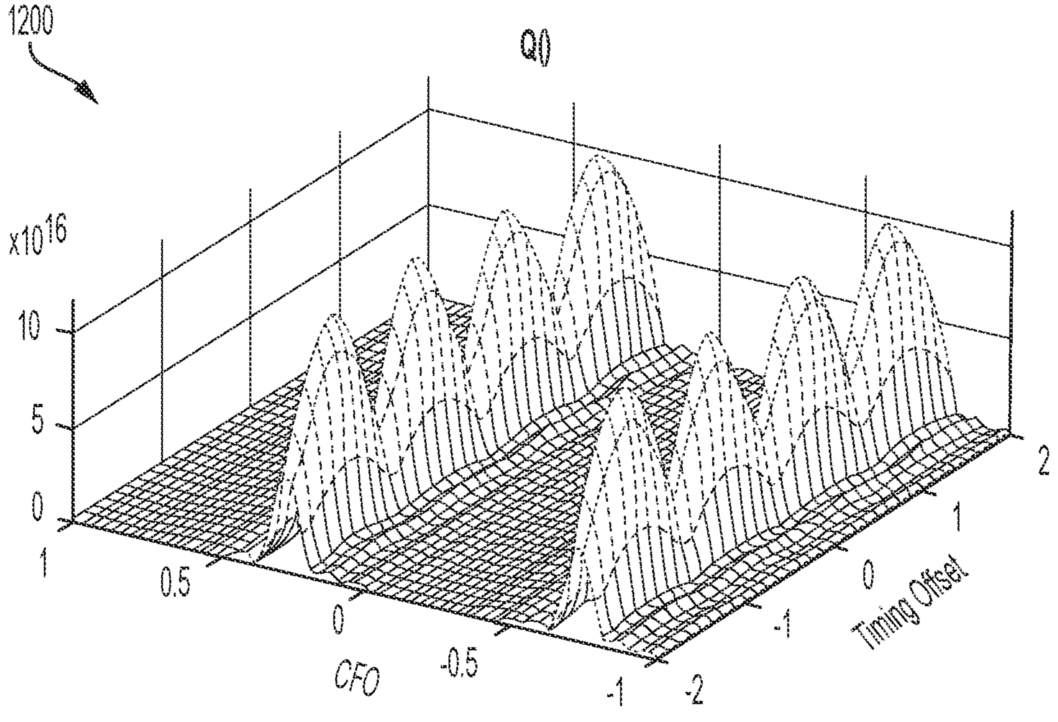
FIG. 12 depicts an example Q( ) of a packet transmitted by a commodity LoRa device.

FIG. 12 depicts an example Q( ) of a packet transmitted by a commodity LoRa device 1200.

Figure 13:
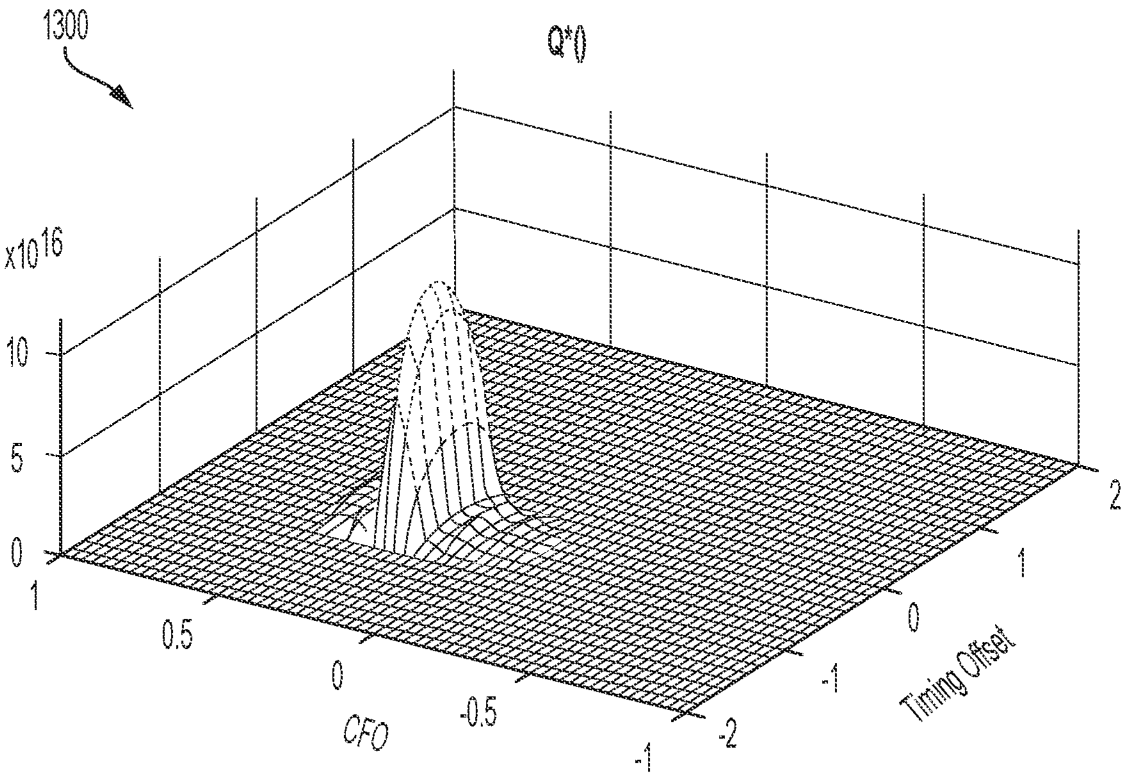
FIG. 13 depicts an example Q*( ) of a packet transmitted by a commodity LoRa device.

FIG. 13 depicts an example Q*( ) of a packet transmitted by a commodity LoRa device 1300.

The search consists of 3 phases. In Phase 1, the search evaluates 17 points along a line where $\delta_t=0$ and $\delta_f$ is from −1 to 0 at a step of f/16. Suppose Q( ) achieves the maximum at (0, $\delta^*$). In Phase 2, the search evaluates a total of 10 points along two lines. On both lines, $\delta_t$ is from −1 to 1 at a step of ½. On one line, $\delta_f=\delta^*$; on the other line, $\delta_f=\delta^*+1$. Suppose Q*( ) achieves the maximum at ($\hat{\delta}t$, $\hat{\delta}f$). In Phase 3, the search evaluates U+1 points along a line where $\delta_t$ is from $\hat{\delta}t$−½ to $\hat{\delta}t$+½ at a step of 1/U and $\delta_f=\hat{\delta}f$. Suppose Q*( ) achieves the maximum at ($\tilde{\delta}t$, $\tilde{\delta}f$). $\tilde{\delta}t$ and $\tilde{\delta}f$ are used as the estimated fractional timing and CFO, respectively.

The search is based on the fact that when the timing is accurate and the CFO has been fully canceled, the total energy of the peaks is the highest and the upchirp peaks and downchirp peaks are all at location 1. By exploiting the nature of Q( ), the computation complexity is significantly reduced compared to a naive approach that may evaluate all possible combinations of $\delta_f$ and $\delta_t$. The top of FIGS. 12-13 show Q( ) of a packet transmitted by a commodity LoRa device, where it can be seen that along any line where $\delta_t$ is fixed, Q( ) achieves high values when $\delta_f$ is correct, or when $\delta_f$ is off by ±1. Therefore, in Phase 1, the search simply is along the line where $\delta_t=0$, which will find either the correct fractional CFO, or off by ±1. In Phase 2, the correct fractional CFO is found by evaluating Q*( ), because the peaks will not be at location 1 if the fractional CFO is off by 1 or −1, as can be seen at the bottom of FIGS. 12-13. In Phase 3, the search is along the line with the correct fractional CFO to pick the best fractional timing offset.

Testing

TnB has been implemented and compared with the state-of-the-art. The implementation is capable of detecting and decoding packets transmitted by commodity LoRa devices. Part of the implementation related to specific operations in LoRa, such as whitening, CRC calculation, etc., are based on the open-source LoRa implementations.

Experiment Setup

Figures 14A, 14B, 14C, 14D:
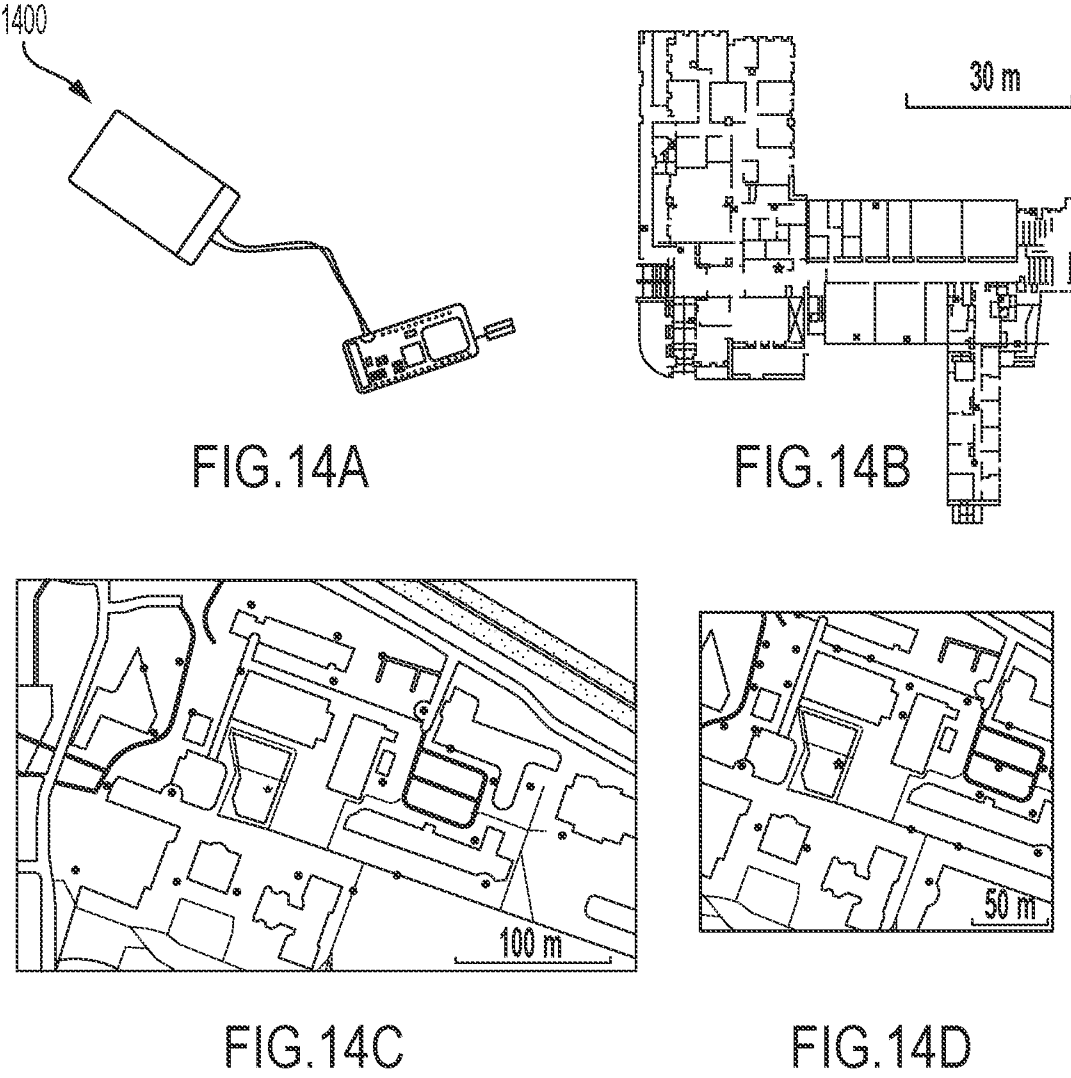
FIGS. 14A-14D depict: (a) an example LoRa node, (b) an example indoor LoRa network, (c) a first example outdoor LoRa network, and (d), a second example outdoor LoRa network.

FIGS. 14A-14D depict example experiment hardware and environments 1400: (a) an example LoRa node, (b) an example indoor LoRa network, (c) a first example outdoor LoRa network, and (d), a second example outdoor LoRa network. In FIGS. 14B-14D, stars represent wireless base station locations. In FIGS. 14B-14D, dark squares and dark dots represent wireless network nodes.

The LoRa nodes used in the experiment are the Adafruit Feather M0 with RFM95 LoRa Radio 900 MHz, one of which is shown in FIG. 14A. One of the nodes acts as the starter. At the beginning of an experiment, the starter transmits a start message 3 times to inform the nodes about the configuration of the experiment, including the SF, the CR, the start time of the experiment, the number of packets to be transmitted by each node, and the duration of the experiment. After receiving the start messages, a node transmits packets at randomly selected times during the experiment. A USRP B210 is placed next to the starter to record the samples, which are written to a trace file. Some common parameters 1500 in all experiments are shown in Table 3 in FIG. 15. The packet transmitted by each node has 16 bytes of payload, which includes 4 bytes of header, 10 bytes of data, and 2 bytes of CRC. A node ID and a sequence number have been added to the data part of the packet to distinguish the packets.

Three deployments have been tested, which are referred to as Indoor, Outdoor 1 and Outdoor 2, with 19, 25, and 25 nodes, respectively. The layout of the deployments are shown in FIG. 14(*b*), FIG. 14(*c*), and FIG. 14(*d*), respectively, where the star is the location of the starter and the USRP sniffer. In each deployment, it was confirmed that each node could communicate with starter. SF 8 and SF 10 were tested for all CR values. For each combination of SF and CR, 5 network traffic load values were tested from 5 pkt/sec to 25 pkt/sec at a step of 5 pkt/sec. For each traffic load, the experiment was repeated 3 times, called three runs. A total of 360 trace files were collected.

Figure 16:
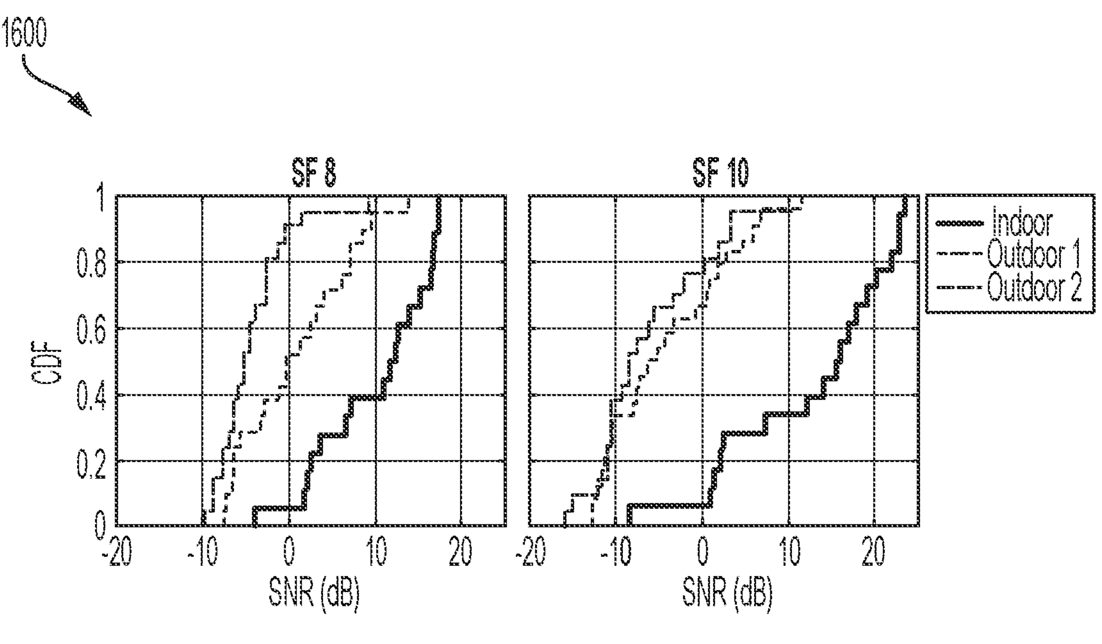
FIG. 16 depicts an example estimated signal-to-noise ratio (SNR) of the three example networks of FIGS. 14B-14D.

FIG. 16 shows the Cumulative Distribution Function (CDF) 1600 of the estimated Signal to Noise Ratio (SNR) of the nodes of the three example networks of FIGS. 14B-14D. To be more specific, for each deployment and SF, the run with the greatest number of nodes that have decoded packets is selected. The SNR of a node is estimated based on the peak heights found in its decoded packets. The SNR estimations are different between SF 8 and SF 10, primarily because more weak packets can be decoded with SF 10. The SNR of the same node can also vary, such as by over 5 dB, in one run. Still, it can be seen that the SNR varies in different deployments, and, within the same deployment, the SNRs of the nodes may also differ by more than 20 dB.

Figure 17:
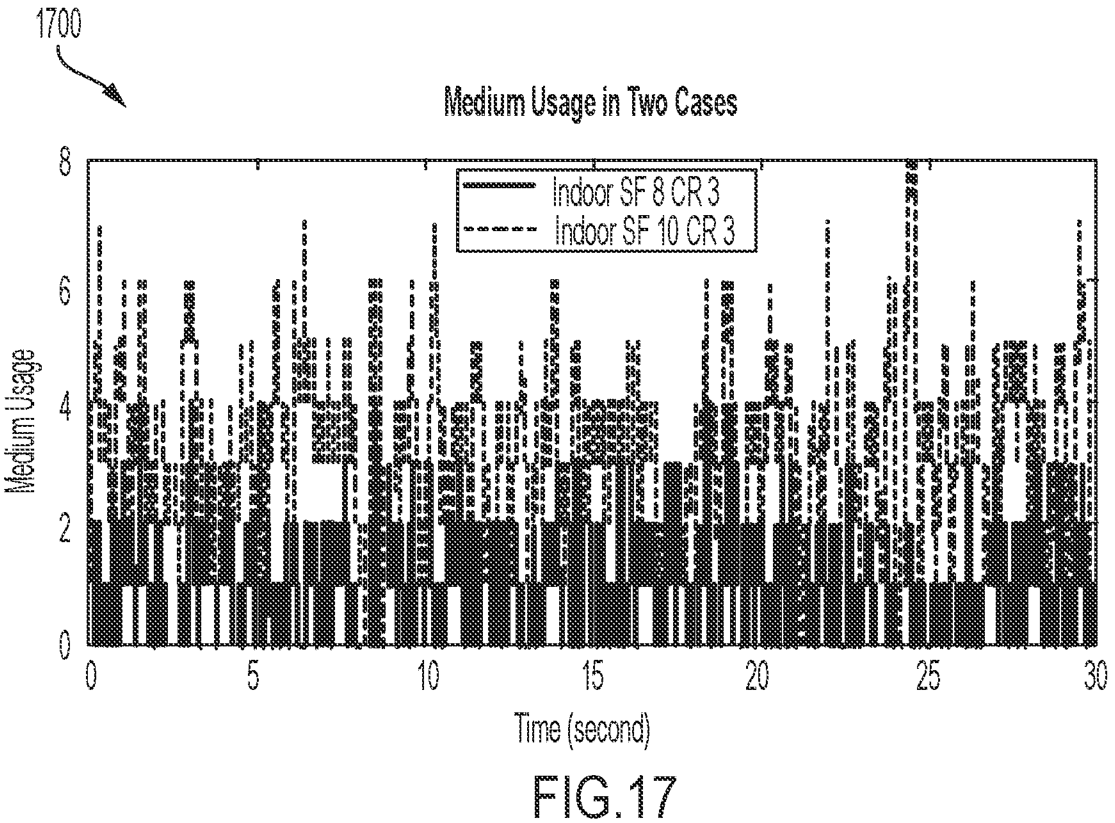
FIG. 17 depicts an example lower bound of medium usage in two test cases at a highest load.

FIG. 17 shows the medium usage 1700 in 2 typical runs at the highest load, where the medium usage of a particular time instant refers to the number of packets on the air at the time and reveals the traffic condition. As the traffic was randomly generated and not all packets were received correctly, the medium usage is a random variable that cannot be known exactly. FIG. 17 shows a lower bound obtained by considering only packets that were correctly decoded by TnB, which is a subset of all transmitted packets. It can be seen that the medium can be very busy both for SF 8 and SF 10, and is more so for SF 10, because the packet is longer with SF 10.

Comparison to Other Techniques

TnB is compared with CIC and AlignTrack, which are recent LoRa packet collision resolution schemes, as well as LoRaPHY, which is an implementation of the original LoRa packet decoder. The testing of AlignTrack poses some challenges, as an open-source implementation was not available. AlignTrack mainly consists of a peak detection algorithm, a packet detection algorithm, and a peak assignment algorithm. The comparison herein focuses on the peak assignment algorithm, denoted as AlignTrack*, because it is the core and main innovation of AlignTrack. AlignTrack* has been implemented and can swap out Thrive as a component of TnB to be tested, solely because AlignTrack* solves the same problem as Thrive. The packet detection algorithm in TnB allows TnB to outperform CIC; in addition, it also lends the benefit of the fractional CFO information to AlignTrack, because AlignTrack estimates only the coarse CFO. Each scheme was tested with exactly the same traces collected in the experiments. As CIC and AlignTrack* find only the peak locations of the packets, their outputs were decoded by the open-source LoRa implementation into data bits.

Test Results

Figures 18, 19:
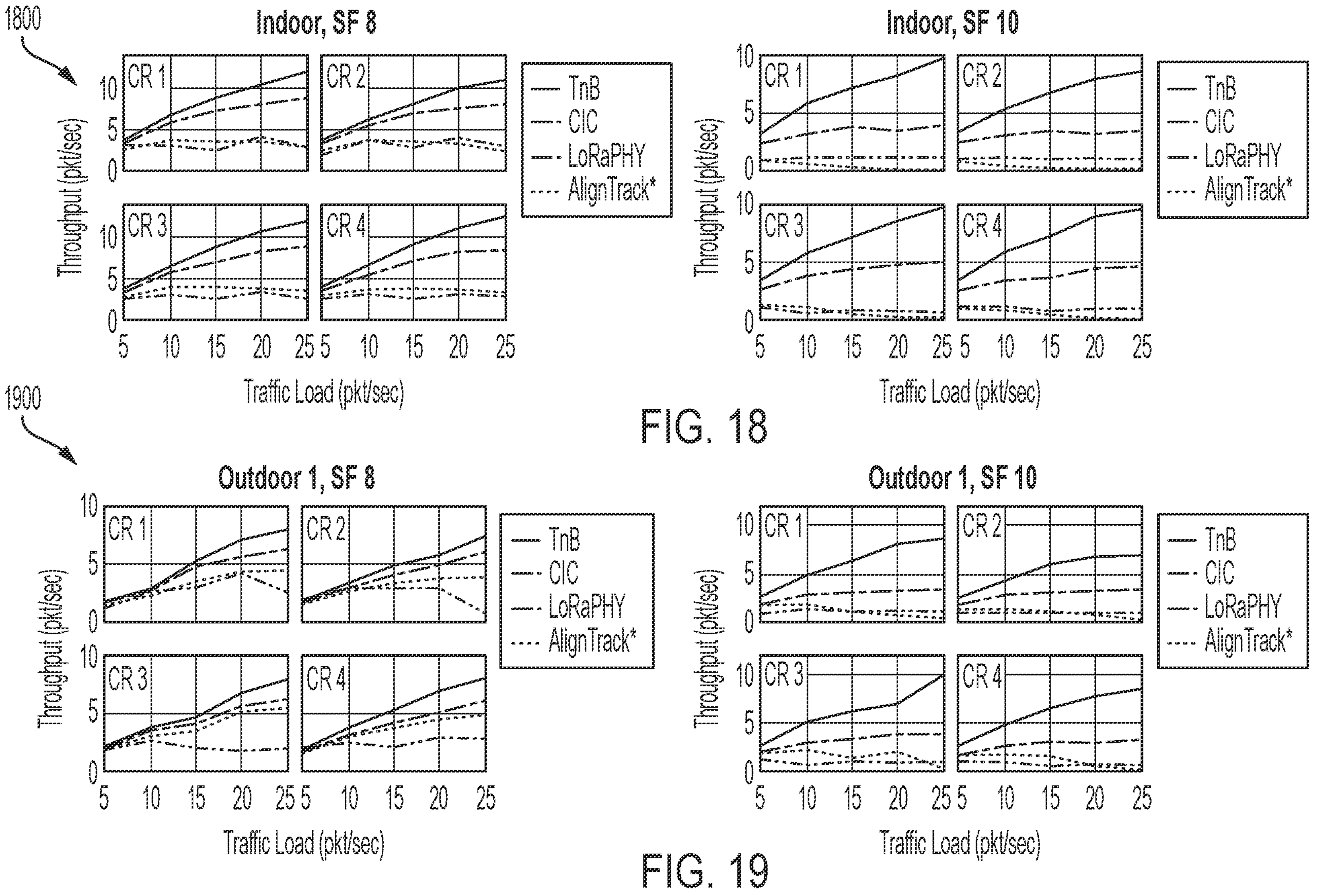
FIG. 18 depicts example throughput versus traffic load test results for an example indoor test with spreading factors of eight and ten.
FIG. 19 depicts example throughput versus traffic load test results for an example test of the first example outdoor LoRa network with spreading factors of eight and ten.
Figure 20:
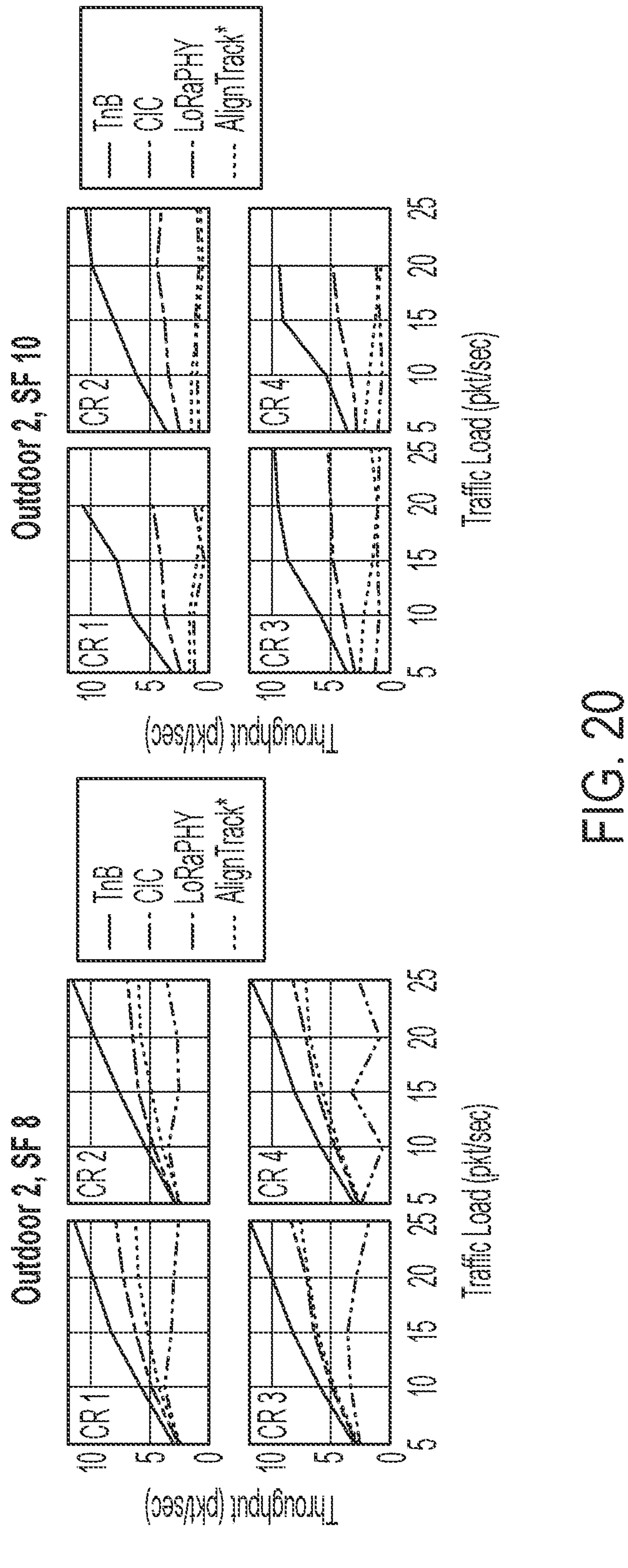
FIG. 20 depicts example throughput versus traffic load test results for an example test of the second example outdoor LoRa network with spreading factors of eight and ten.

The test results are shown in FIGS. 18-20 for Indoor, Outdoor 1, and Outdoor 2, respectively.

FIG. 18 depicts example throughput versus traffic load test results for an example indoor test with spreading factors of eight and ten.

FIG. 19 depicts example throughput versus traffic load test results for an example test of the first example outdoor LoRa network with spreading factors of eight and ten.

FIG. 20 depicts example throughput versus traffic load test results for an example test of the second example outdoor LoRa network with spreading factors of eight and ten.

In most cases, a data point is the average of three runs. In some cases, however, the number of nodes that responded to the start messages are significantly smaller, which leads to biased results. A simple rule is applied to filter such cases; that is, the result of a run is used, if the number of nodes with decoded packets is at least half of the maximum number of nodes with decoded packets in the same deployment. Only two cases were found with no valid data after the filtering, namely, in Outdoor 2 for the highest load when the SF is 10 and the CR is 1 and 4. In other cases, because some nodes might not have responded, the traffic load values shown in the figures, which assume all nodes responded in the experiment, is higher than the actual traffic load. The comparison is still fair because all schemes process exactly the same traces.

It can be seen that, first, TnB achieves much higher throughput than the compared schemes. At the highest tested load, the median throughput increase of TnB over CIC among all CR values in all experiments are 1.36× and 2.46× for SF 8 and 10, respectively. The highest improvement is 2.59× for the Outdoor 1 deployment with SF 10 and CR 3. Second, the gain of TnB over CIC is significantly higher for SF 10 than SF 8, because the packet duration is longer with SF 10, resulting in more collisions. For the same reason, LoRaPHY still decoded a decent number of packets for SF 8, but not SF 10. Lastly, the performance of AlignTrack* is similar to CIC for the two outdoor cases with SF 8, but is much lower with SF 10.

Figure 21:
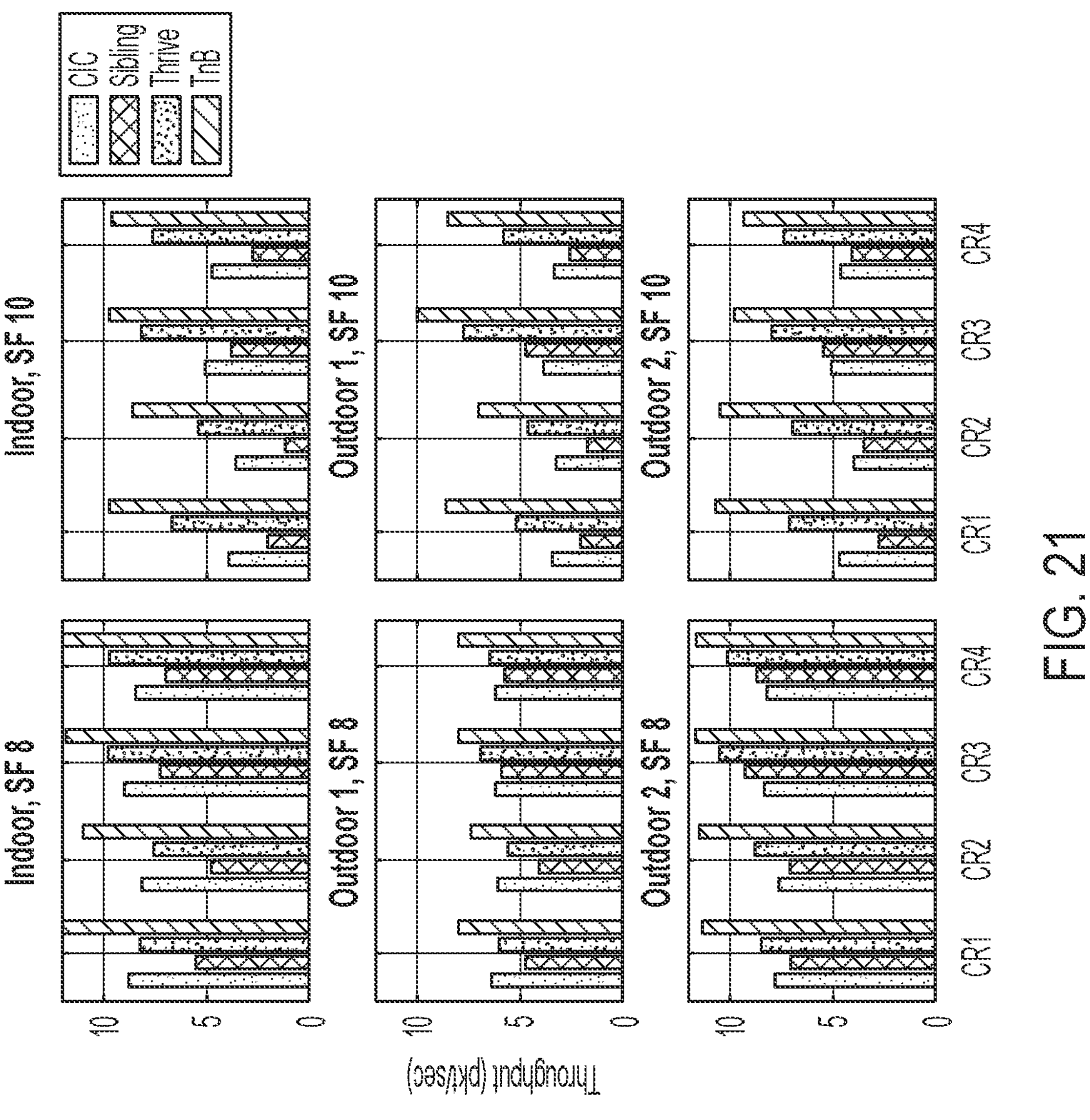
FIG. 21 depicts an example comparison of example performance of the provided techniques versus Concurrent Interference Cancellation (CIC).

Further analysis was conducted with the results from experiments at the highest load with valid data in each deployment. First, to understand the source of the gains, TnB is tested with various configurations. To be more specific, in this example of testing, Thrive refers to TnB without BEC and uses the default Hamming code decoder, and Sibling refers to Thrive without the history cost and relying only on the sibling cost. The performances of these configurations are shown in FIG. 21, along with those of CIC for comparison. FIG. 21 depicts an comparison of example performance of the provided techniques versus Concurrent Interference Cancellation (CIC) 2100. It can be seen that Thrive is similar to CIC for SF 8, but outperforms CIC for SF 10, suggesting that Thrive is an effective peak assignment algorithm. The median improvement of TnB over Thrive is 1.31×, confirming the contribution of BEC. Sibling does not perform well in certain cases, revealing the importance of the peak history information.

Figure 22:
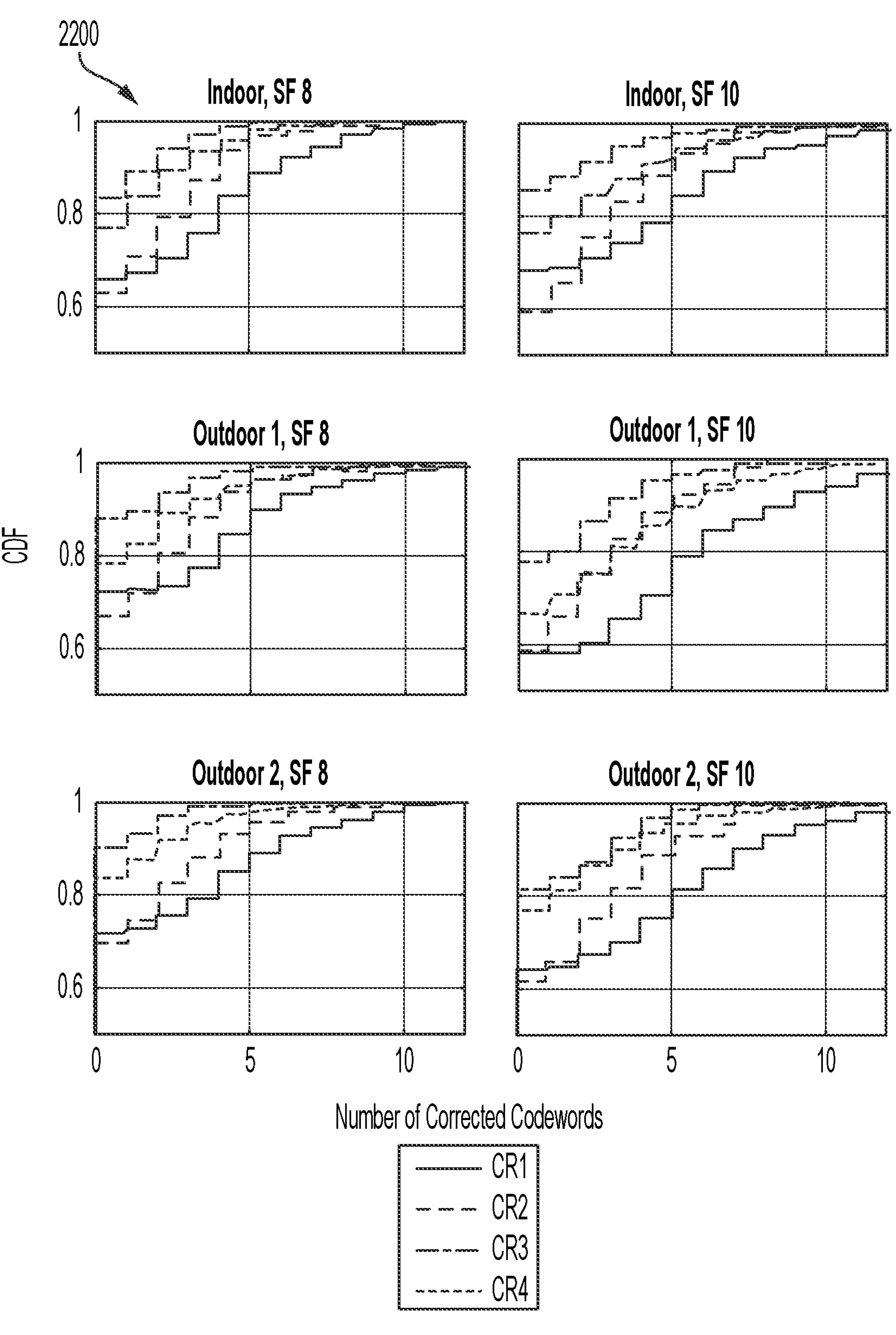
FIG. 22 depicts example charts of example numbers of codewords recovered by block-based error correction in a packet.

FIG. 22 depicts charts of example numbers of codewords recovered by block-based error correction in a packet 2200. FIG. 22 reveals more details about BEC, which shows the CDF of the number of BEC rescued codewords in each decoded packet, which are those decoded by BEC but not decoded correctly by the default decoder. The fraction of packets rescued by BEC can be in the figure, which is the fraction of packets with at least one BEC rescued codeword. In such packets, it can be seen that there can be multiple rescued codewords.

Figures 23, 24:
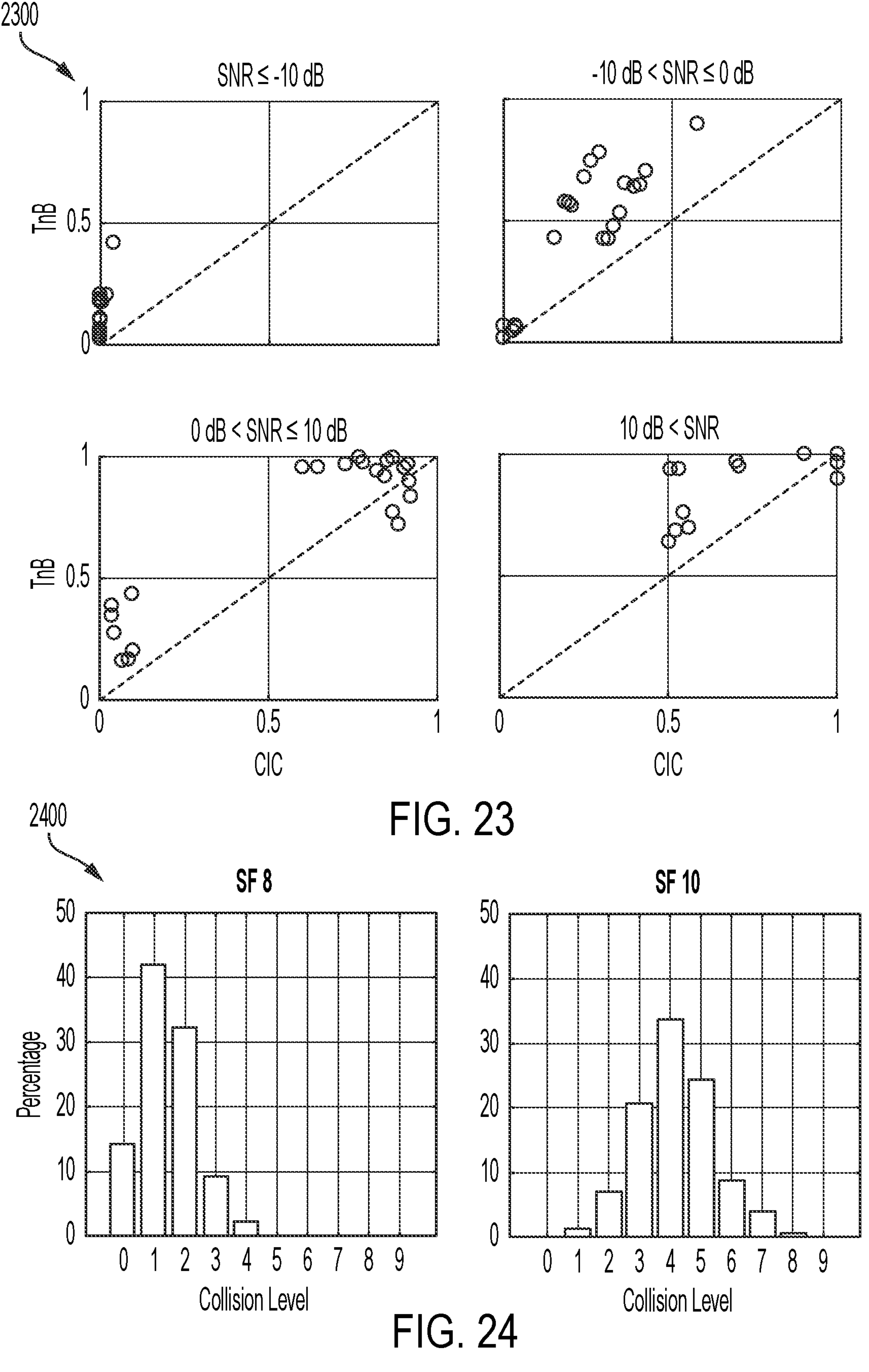
FIG. 23 depicts an example scatter plots of a Packet Receiving Ratio (PRR) at various Signal-to-Noise Ratio (SNR) ranges.
FIG. 24 depicts example collision levels of packets decoded by the provided techniques.

FIG. 23 depicts example scatter plots of a Packet Receiving Ratio (PRR) at various SNR ranges 2300. FIG. 23 shows the scatter plots of the Packet Receiving Ratio (PRR) of TnB and CIC in different ranges of SNR, where each marker represents one combination of SF and CR in a deployment within a particular SNR range. It can be seen that higher SNR leads to higher PRRs. Except a few cases, TnB achieves higher PRRs than CIC in all ranges of SNR.

FIG. 24 depicts example collision levels of packets decoded by the provided techniques 2400. FIG. 24 shows the percentage of packets decoded by TnB at different collision levels, where the collision level of a packet is defined as the highest number of packets it collided with during its transmission. Similar to the medium usage shown in FIG. 17, the collision level is estimated by considering only the packets decoded by TnB, and is therefore a lower bound. It can be seen that less than 15% of decoded packets with SF 8 had no collision, while others typically collide with at least 1 or 2 packets. The majority of packets decoded with SF 10 collided with 4 or more packets.

Lastly, AlignTrack* did not perform well for SF 10 because it is very sensitive to peaks that may occur accidentally, which are found more with SF 10 than with SF 8. Such accidental peaks may be generated by noise, interference, etc. Typically, they can be seen in one signal vector but not in others, which poses a problem, because AlignTrack* considers a peak to be aligned to a symbol if it is higher in this symbol than in other symbols. As a result, once there is an accidental peak, AlignTrack* finds more than one peak aligned with a symbol, among which one is the correct peak and others the accidental peaks. In such cases, an arbitrary and often incorrect decision has to be made.

Comparisons with Simulation

Additional evaluation was conducted with simulations, which was intended mainly to examine more challenging channel conditions, i.e., the Long-term Evolution (LTE) Extended Typical Urban (ETU) model, which represents channels with strong multi-path and fluctuations, because strong channel fluctuations were not observed in the experiments due to the lack of mobility in the environment. The simulation setup is mostly identical to the experiments, with the same bandwidth, OSF, packet size, and duration. The SNR ranges of SF 8 and SF 10 are [0, 20] dB and [−6, 14] dB, respectively. The CFO of a packet is randomly selected from [−4.88, 4.88] kHz. The delay spread of the ETU channel is 5 μs and the Doppler shift is 5 Hz.

The compared schemes are CIC, AlignTrack*, and TnB. CIC and AlignTrack* are also combined with BEC, denoted as CIC+ and AlignTrack*+, respectively, to test BEC when combined with other methods. Thrive and TnB2ant are also tested, where TnB2ant is when the TnB receiver has 2 antennas, because high channel fluctuations result in a high outage probability for single antenna systems, which can be mitigated by a higher antenna diversity.

Figure 25:
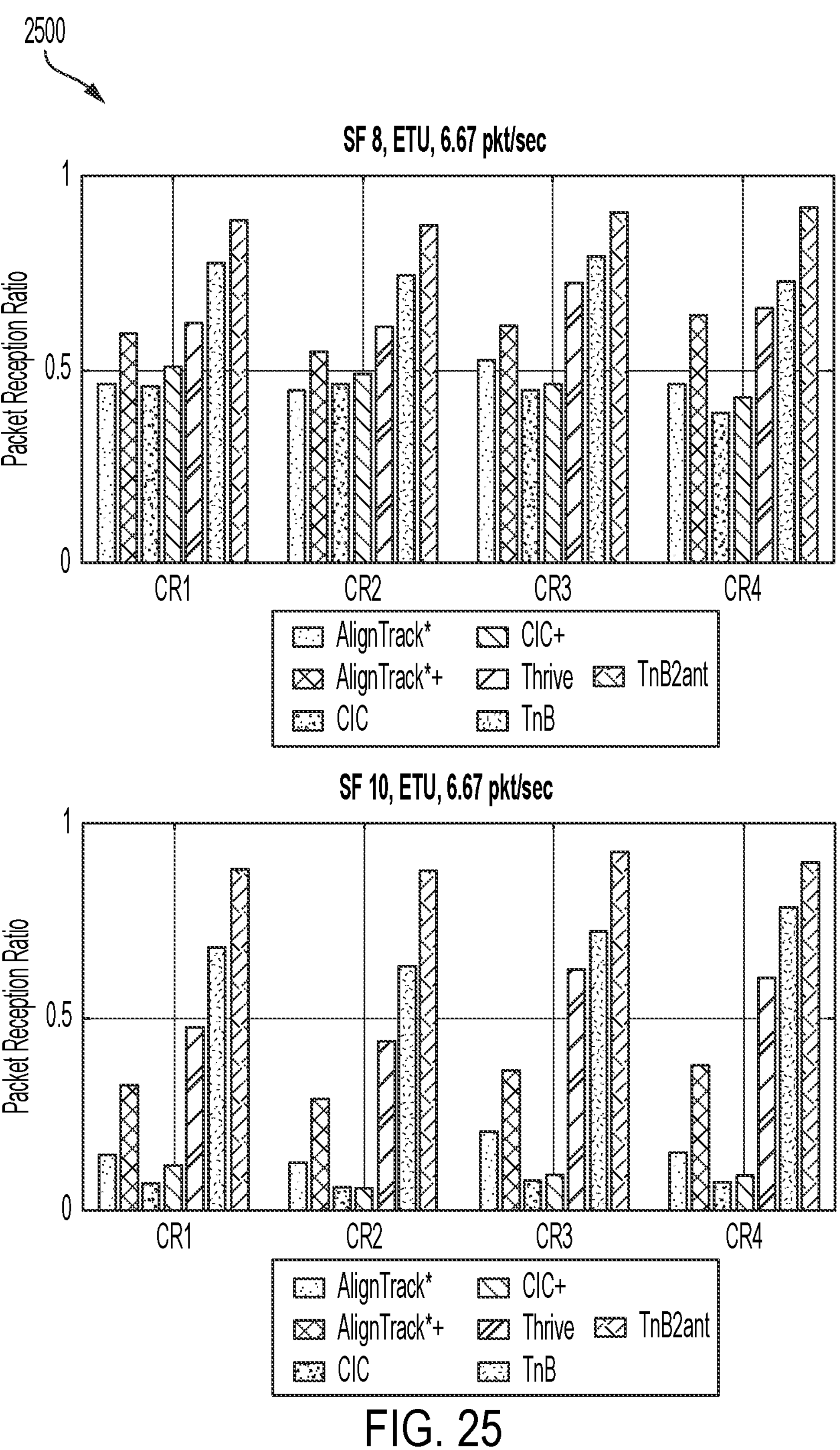
FIG. 25 depicts example simulation results in an Extended Typical Urban (ETU) channel.

FIG. 25 depicts example simulation results 2500 in an ETU channel. The results are shown in FIG. 25, where the traffic load is selected such that the PRR of TnB2ant of at least one CR is above 0.9. It can be observed that TnB2ant achieves PRRs close to or above 0.9 in the ETU channels. TnB, as well as Thrive, achieves much higher gains over CIC in the ETU channels than in the experiments, especially for SF 10, suggesting that CIC may need further enhancements to cope with large channel fluctuations. It can also be seen that BEC can be combined with CIC and AlignTrack* and always improve the performance. AlignTrack* sometimes achieves better performance than CIC in the simulation, an improvement since the experimental evaluation, likely because the interference in the experimental traces leads to more accidental peaks.

Properties of Companions

The companion is a key concept for CR 2 or above. For CR 2, the companion of a column is another column and is unique. It can be verified that the companion pairs are $c_1$ and $c_5$, $c_2$ and $c_3$, $c_4$ and $c_6$.

For CR3, if $|\Pi|=2$, the companion of $\Pi$ contains only one column and is unique. To see this, suppose $\Pi$ consists of columns $c_{k1}$ and $c_{k2}$, and has two companions, namely, $c_k'$ and $c_k''$. Consider vectors $V(c_{k1}, c_{k2}, c_k')$ and $V(c_{k1}, c_{k2}, c_k'')$, both must be codewords but with Hamming distance only two, a contradiction, as the minimum Hamming distance is 3.

For CR 4, $|\Pi|=3$, the companion of $\Pi$ contains one column and is unique. As mentioned earlier, if $|\Pi|=2$, $\Pi$ has 3 possible companions. For example, the companions of $\{c_1, c_2\}$ are $\{c_6, c_8\}$, $\{c_3, c_5\}$, and $\{c_4, c_7\}$, because there are 3 codewords with weight 4, namely, [11000101], [11101000], and [11010010], where bits 1 and 2 are both '1'. The same argument can be applied to other pairs of columns.

Properties of $\Xi$

Except for the special and simple case of CR 1, the decoding process can depend on $\Xi$. This is because a column in $\Xi$ is either a true error column, or the companion of the true error columns.

For CR 2, if there is a single error column, say, $c_k$, the companion of $c_k$ is another column denoted as $c_k'$. And, if a row has an error in $c_k$, the default decoder flips either the bit in $c_k$ or in $c_k'$. Therefore, $|\Xi|$ is either 1 or 2.

For CR 3, consider the case with two error columns, denoted as $c_{k1}$ and $c_{k2}$, and suppose their companion is $c_k'$. In any row i, there are 4 possible cases:

No error in both $c_{k1}$ and $c_{k2}$: $R_i$ and $\Gamma_i$ are identical

No error in $c_{k1}$ but error in $c_{k2}$: $R_i$ and $\Gamma_i$ differ in $c_{k2}$ Error in $c_{k1}$ but no error in $c_{k2}$: $R_i$ and $\Gamma_i$ differ in $c_{k1}$ Errors in both $c_{k1}$ and $c_{k2}$: $R_i$ and $\Gamma_i$ differ in $c_k'$ Therefore, with two error columns, $|\Xi|\le 3$.

For CR 4, the case with two error columns, say, $c_{k1}$ and $c_{k2}$, can be analyzed similarly as that for CR 3, except when there are errors in both $c_{k1}$ and $c_{k2}$, because $R_i$ and $\Gamma_i$ shall differ in $c_{k1}$ and $c_{k2}$, or in the columns of one of their companions, and therefore, no column will be added to $\Xi$ and $|\Xi|\le 2$. For CR 4, when there are three error columns, $|\Xi|\le 4$, because the companion of any 3 error columns is one column.

Properties of $\Delta_1$

Clearly, $\Delta_1$ shall succeed with $\Pi$ if $\Pi$ is the set of true error columns. In the following, $\Delta_1$ in other cases are analyzed, in which $\Omega$ denotes the set of true error columns and $\Omega=\{c_{k1}, c_{k2}, \ldots, c_{kn}\}$.

Lemma 1. If the companion of $\Omega$ is a column denoted as $c_k'$, $\Delta_1$ shall succeed if $\Pi$ consists of all but one true error column, as well as $c_k'$.

Proof. Without Loss Of Generality (WLOG), suppose R is repaired with $\{c_k', c_{k2}, \ldots, c_{kn}\}$. For any row i, suppose the original transmitted codeword is $\theta$. If there is no error in $c_{k1}$, clearly, after masking, the remaining bits in $R_i$ match $\theta$; otherwise, the remaining bits match $\theta'=\theta\oplus V(c_{k1}, c_{k2}, \ldots, c_{kn}, c_k')$, which is another codeword.

Lemma 2. If the companion of $\Omega$ is a column denoted as $c_k'$, and if the minimum Hamming distance of the code is 3 or more, $\Delta_1$ shall not succeed if $\Pi$ consists of all but one true error columns, as well as another column $c_k''$ other than $c_k'$.

Proof. WLOG, suppose R is repaired with $\{c_k'', c_{k2}, \ldots, c_{kn}\}$. Consider a row i where $R_i$ has an error in $c_{k1}$. WLOG, further suppose the original transmitted codeword, denoted as $\theta$, is the all 0 codeword. If the claim is not true, suppose $R_i$ matches a codeword $\theta''$ in the remaining columns after masking. Clearly, $\theta''=\theta$. Also, $\theta''/=\theta'$, where $\theta'=V(c_{k1}, c_{k2}, \ldots, c_{kn}, c_k')$, because $\theta'$ is 1 in $c_k'$, while $\theta''$ must be 0 in $c_k'$, as $c_k'$ has not been masked. $\theta''$ can be 1 only in $\{c_k'', c_{k2}, \ldots, c_{kn}\}$, and therefore has only distance 2 to 0', a contradiction.

Independence Assumption

In examples, when analyzing the decoding error probability, it can be assumed the bits in the error columns are flipped independently with probability 0.5, referred to as the independence assumption. The independence assumption makes the analysis tractable, but is an approximation, because at least one bit must have been flipped in each error column.

Figure 26:
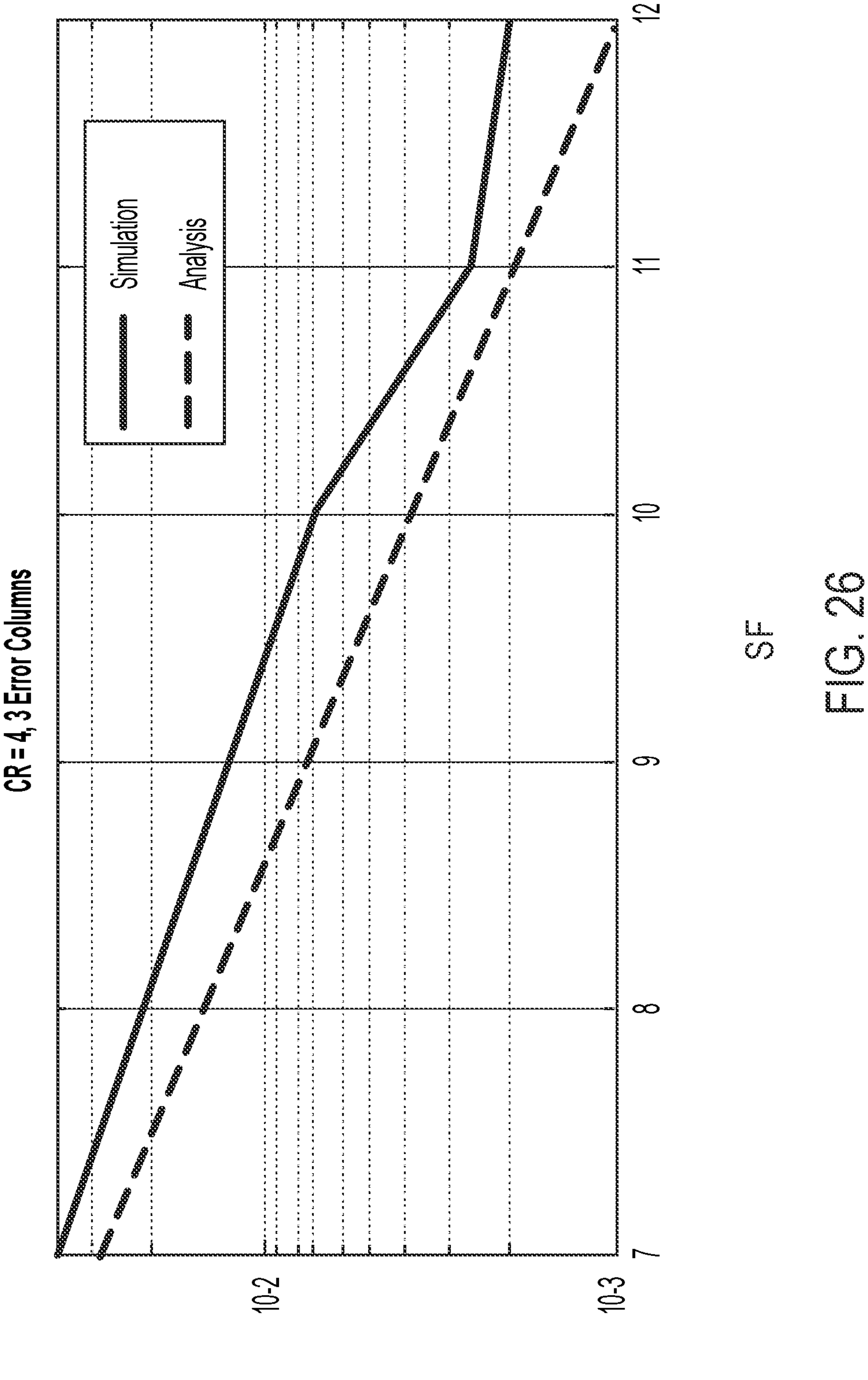
FIG. 26 depicts example decoding error probability when a coding rate is four and there are three error columns.

FIG. 26 depicts example decoding error probability 2600 when a coding rate is four and there are three error columns. FIG. 26 shows that the approximations are reasonably close to the actual decoding error probabilities.

Analysis for CR 3 with 2-Column Errors

Suppose $c_{k1}$ and $c_{k2}$ are the two true error columns and their companion is $c_k'$. A decoding error occurs when in every row, either there is no error in both $c_{k1}$ and $c_{k2}$, or there are errors in both $c_{k1}$ and $c_{k2}$, such that $\Xi$ contains only $c_k'$. BEC shall return prematurely, believing that there is only one error column. The error probability is $2^{-SF}$ under the independence assumption.

Analysis for CR 4 with 2-Column Errors

BEC always corrects 2-column errors for CR 4, because any column in $\Xi$ must be a true error column; therefore, the repair when $|\Xi|$ is 1 or 2 must be successful. When $|\Xi|$ is 0, for any row in $\phi_2$, the two columns where R and $\Gamma$ differ must either be the true error columns, or their companion.

Analysis for CR 4 with 3-Column Errors

BEC is capable of correcting 3-column errors if $|\Xi|>0$. The cases when $|\Xi|=2$, 3, and 4 are straightforward. The case when $|\Xi|=1$ is proved in the following.

Lemma 3. BEC can correct the errors when there are three error columns and $|\Xi|=1$.

Proof. BEC applies $\Delta_2$ to R using the column in $\Xi$. Clearly, this will not repair R. The purpose is instead to discover the error columns. To see this, suppose there are indeed 3 error columns denoted as $c_{k1}$, $c_{k2}$, and $c_{k3}$, and their companion is $c_k'$. First, suppose the column in $\Xi$ is $c_k'$. In this case, there is no row with only one error in one of the true error columns, i.e., every row has 0, 2, or 3 errors. As BEC did not return with the assumption that there was only 1 error column, there must be some rows with two errors. Suppose one of such rows, denoted as $R_i$, has errors in $c_{k1}$ and $c_{k2}$. Clearly, flipping the bit in $c_k'$ will change $R_i$ to a codeword except in $c_{k3}$. As BEC did not return with the assumption that there were only 2 error columns, there must be at least another row with 2 errors not in $c_{k1}$ and $c_{k2}$. Clearly, in this row, flipping the bit in $c_k'$ will reveal another true error column. Therefore, it is guaranteed that at least two true error columns will be revealed. The same argument holds when the column in $\Xi$ is one of the true error columns.

As the errors are random and can either be 0 or 1 in the error columns in a particular row, when there are 3 error columns, in each row, there are 8 possible combinations. Let $\psi_x$ denote the probability that exactly x distinct error combinations occur in R. Clearly, $\psi_1=(1)SF$. For x>1, it can be verified that the following recursive relation hold under the independence assumption:

$$\Psi_x = \left(\frac{x}{8}\right)^{SF} - \sum_{y=1}^{x-1} \binom{x}{y} \psi_y.$$

The following Lemma explains the decoding error probability.

Lemma 4. Under the independence assumption, the decoding error probability of CR 4 when there are three error columns is $\psi_1+7\psi_2+9\psi_3+3\psi_4+2^{-SF}$.

Proof. Suppose $c_{k1}$, $c_{k2}$ and $c_{k3}$ are the true error columns, and their companion is $c_k'$. With 3-column errors, any column in $\Xi$ must be a true error column or $c_k'$. A decoding error occurs when BEC returns prematurely, i.e., returns with the assumption that the number of error columns is less than 3.

BEC may return prematurely with the assumption that there is 1 error column, if every row has 3 errors, or if some rows have no error but all other rows have 3 errors. Therefore, the probability is $\psi_1+\psi_2$.

When testing the hypothesis that there are 2 error columns, there are three cases depending on $|\Xi|$. If $|\Xi|=0$, every row has 0 or 2 errors. BEC will not return prematurely, because the 4 pairs must be from the same companion group, which occurs only if the errors occur in the same two columns in every row, or do not occur.

If $|\Xi|=1$, first, suppose the column in $\Xi$ is $c_k'$. Clearly, there is no row with a single error. In order for BEC to return prematurely at this point, there must be at least one row with two errors. WLOG, suppose the errors occur in $c_{k1}$ and $c_{k2}$ in this row. It follows that all rows with two errors must have errors in $c_{k1}$ and $c_{k2}$, because the repair would not appear successful otherwise. There also must be at least one row with 3 errors. As long as these conditions are met, some row may have no error. Therefore, the probability is $\psi_2+\psi_3$. There are two other combinations of two error columns. Second, suppose the column in $\Xi$ is $c_{k1}$. There also must be least one row with two errors, and all such rows must have errors in the same two columns. There cannot be a row with 3 errors. As a result, in the rows with 2 errors, the errors must occur in $c_{k2}$ and $c_{k3}$, because otherwise there will be less than 3 error columns in total. Therefore, the probability is $\psi_2+\psi_3$. Also, $\Xi$ may also be one of the other two error columns. The total error probability when $|\Xi|=1$ is therefore $6(\psi_2+\psi_3)$.

If $|\Xi|=2$, first, $\Xi$ cannot contain two true error columns, because masking the two columns will not make $R_i$ identical to a codeword in the remaining columns, where $R_i$ is a row with an error in the error column that has not been masked.

Therefore, WLOG, suppose $\Xi$ contains $c_{k1}$ and $c_k'$. In order for BEC to return prematurely at this point, among the rows with two errors, all errors must occur in the same two columns. In addition, the two columns must be $c_{k2}$ and $c_{k3}$, because if one row, say, $R_i$, has errors in $c_{k1}$ and $c_{k2}$, after masking $c_{k1}$ and $c_k'$, the remaining columns differ either in $c_{k2}$ or $c_{k3}$ with the closest codeword. There also must be at least one row with 3 errors, as well as one row with only one error in $c_{k1}$. As long as these conditions are met, some row may have no errors. Therefore, the probability is $\psi_3+\psi_4$. The same argument can be applied to the cases when $\Xi$ contains other true error columns. Therefore, the total error probability when $|\Xi|=2$ is $3(\psi_3+\psi_4)$.

In addition, decoding failure occurs when BEC tests the hypothesis that there are 3 error columns but finds $|\Xi|=0$. The probability is $2^{-SF}$ under the independence assumption, because there can only be 0 or 2 errors in each row.

FIG. 26 shows the decoding error probabilities when the CR is 4 with 3 error columns. It can be seen that: 1) the error probability is less than 0.04 when the SF is 7, 2) the error probability decreases as the SF increases, and 3) the analysis and the simulation results are reasonably close.

Figure 27:
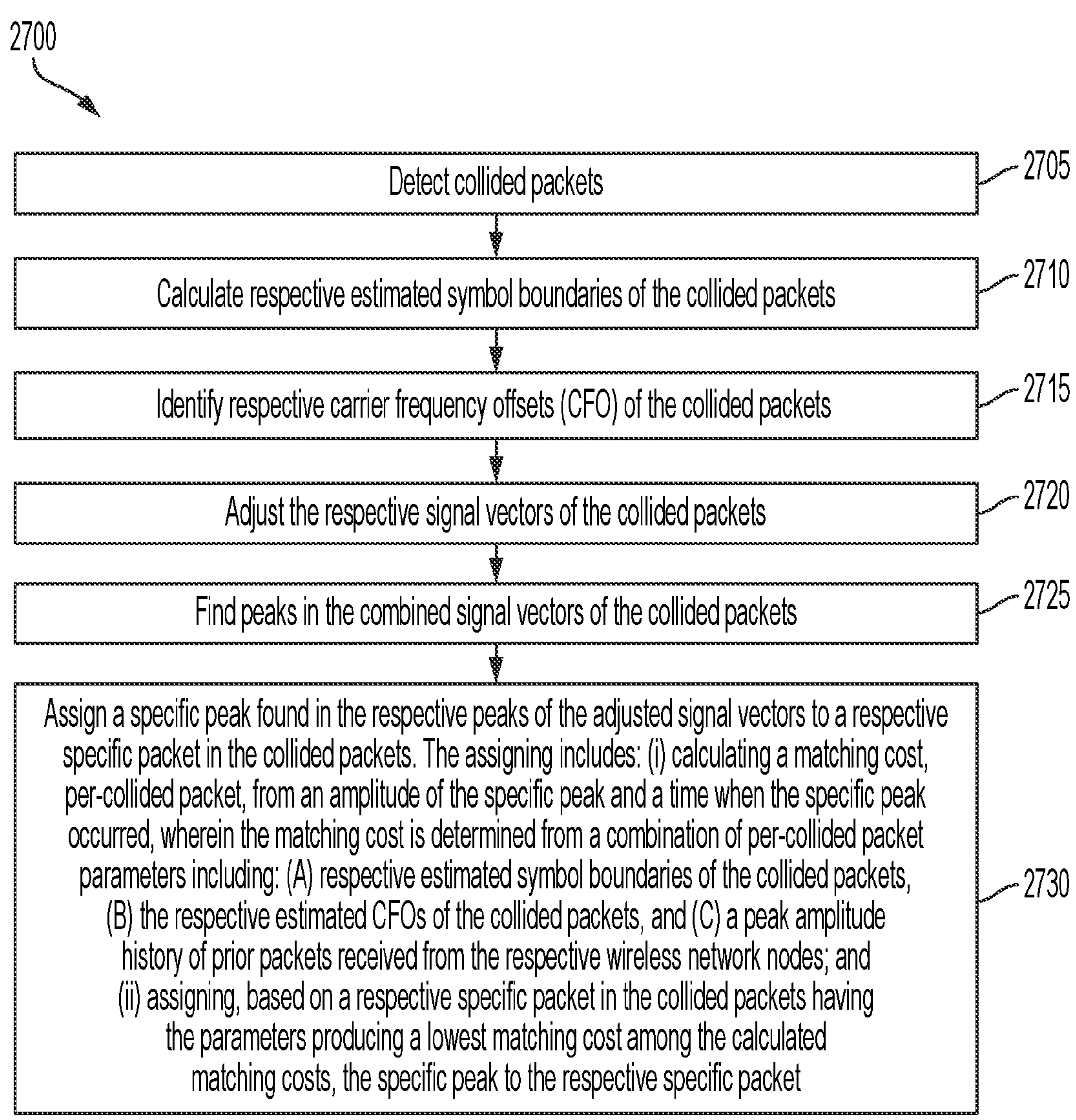
FIG. 27 depicts an example method for recovering collided packets.

FIG. 27 depicts an example method for recovering collided packets 2700, such as packets received via a wireless network. The method for recovering collided packets 2700 can be performed by the apparatus described hereby, such as an example computing device 2800 depicted in FIG. 28.

As illustrated in block 2705, one or more of the apparatus described hereby can detect the collided packets. In examples, the collided packets can be received from respective wireless network nodes. The collided packets can have respective signal vectors. The respective signal vectors can have respective peaks that are interleaved as a result of the collision. As used herein, the signal vectors having respective peaks that are interleaved as a result of the collision may also be referred to as combined signal vectors. The collided packets can include respective contiguous symbols having respective symbol boundaries.

In some examples, the wireless network can be a low-power wide area network (LPWAN).

As illustrated in block 2710, one or more of the apparatus described hereby can calculate respective estimated symbol boundaries of the collided packets.

As illustrated in block 2715, one or more of the apparatus described hereby can identify respective carrier frequency offsets (CFOs) of the collided packets.

As illustrated in optional block 2720, one or more of the apparatus described hereby can adjust the respective signal vectors of the collided packets. In examples, the adjusting respective signal vectors of the collided packets can include aligning the collided packets in time to the respective estimated symbol boundaries. In some embodiments, the adjusting respective signal vectors of the collided packets can include correcting the respective CFOs of the collided packets to respective estimated CFOs.

As illustrated in block 2725, one or more of the apparatus described hereby can find peaks in the combined signal vectors of the collided packets.

In some examples, the method for recovering collided packets 2700 can include, prior to the assigning step, masking a known respective peak in the collided packets that is in a preamble of a respective collided packet, known to be in a packet that is correctly decoded, or both.

As illustrated in block 2730, one or more of the apparatus described hereby can assign a specific peak found in the respective peaks to a respective specific packet in the collided packets. In examples, the respective peaks can be present in the adjusted signal vectors, the respective signal vectors of the collided packets (i.e. signal vectors that have not been adjusted in block 2720), respective signal vectors of packets that are not collided, or a combination thereof.

In some examples, the assigning can include calculating a matching cost, per-collided packet, from an amplitude of the specific peak and a time when the specific peak occurred. In some examples, the matching cost can be determined from per-collided packet parameters. The packet parameters can include respective estimated symbol boundaries of the collided packets, the respective estimated CFOs of the collided packets, a peak amplitude history of prior packets received from the respective wireless network nodes, or a combination thereof.

In some examples, block 2730 can include assigning the specific peak to the respective specific packet. In some examples, the assigning the specific peak can be based on a respective specific packet in the collided packets having the packet parameters producing a lowest matching cost among the calculated matching costs.

In some embodiments, the peak amplitude history can be determined by measuring a deviation of an amplitude of the specific peak from an expected peak amplitude for a specific wireless network node. The expected peak amplitude for the specific wireless network node can be determined by curve-fitting historical data indicating changes to historical peaks for the specific wireless network node.

In some examples, the method for recovering collided packets 2700 can include iteratively performing the assigning step of block 2730 for peaks in the combined signal vectors of the collided packets to produce recovered packets from the collided packets.

In some nonlimiting examples, the method for recovering collided packets 2700 can include performing block-based error correction on packets received at an apparatus described herein. In some embodiments, the received packets may be received from a wireless network node. In some nonlimiting examples, the block-based error correction can be performed on the recovered packets that were recovered from the collided packets.

In some embodiments, the block-based error correction can include decoding, using block-based error correction, a packet (e.g. a recovered packet in the recovered packets). The block-based error correction can include decoding a respective physical layer header of the packet (e.g. the recovered packets) to identify a parameter of a respective payload. The parameter can include a coding rate.

In some embodiments, the block-based error correction can include producing, using a default decoder, a cleaned block by replacing each row of a received block in the packet (e.g. the recovered packet) with a codeword having a minimum Hamming distance.

In some examples, the block-based error correction can include determining a presence of two or more error columns in the received block in the packet (e.g. the recovered packet) by identifying a difference between the received block and the cleaned block.

In some examples, the block-based error correction can include correcting the two or more error columns. The two or more error columns can be corrected by masking at least of the one error columns, generating candidate fixed blocks for combinations of the two or more error columns by replacing each row in the received block with a respective codeword that matches bits in the non-masked columns, and performing a packet-level Cyclic Redundancy Check (CRC) on the candidate fixed blocks to identify the correct candidate fixed block. The packet-level CRC can identify the correct candidate fixed block with a CRC pass indication.

In some examples, the block-based error correction can be performed following identifying all symbols in a physical layer header of the recovered packet.

The blocks in FIG. 27 are not limiting of the examples. The blocks can be combined, the order can be rearranged, or both, as practicable.

Figure 28:
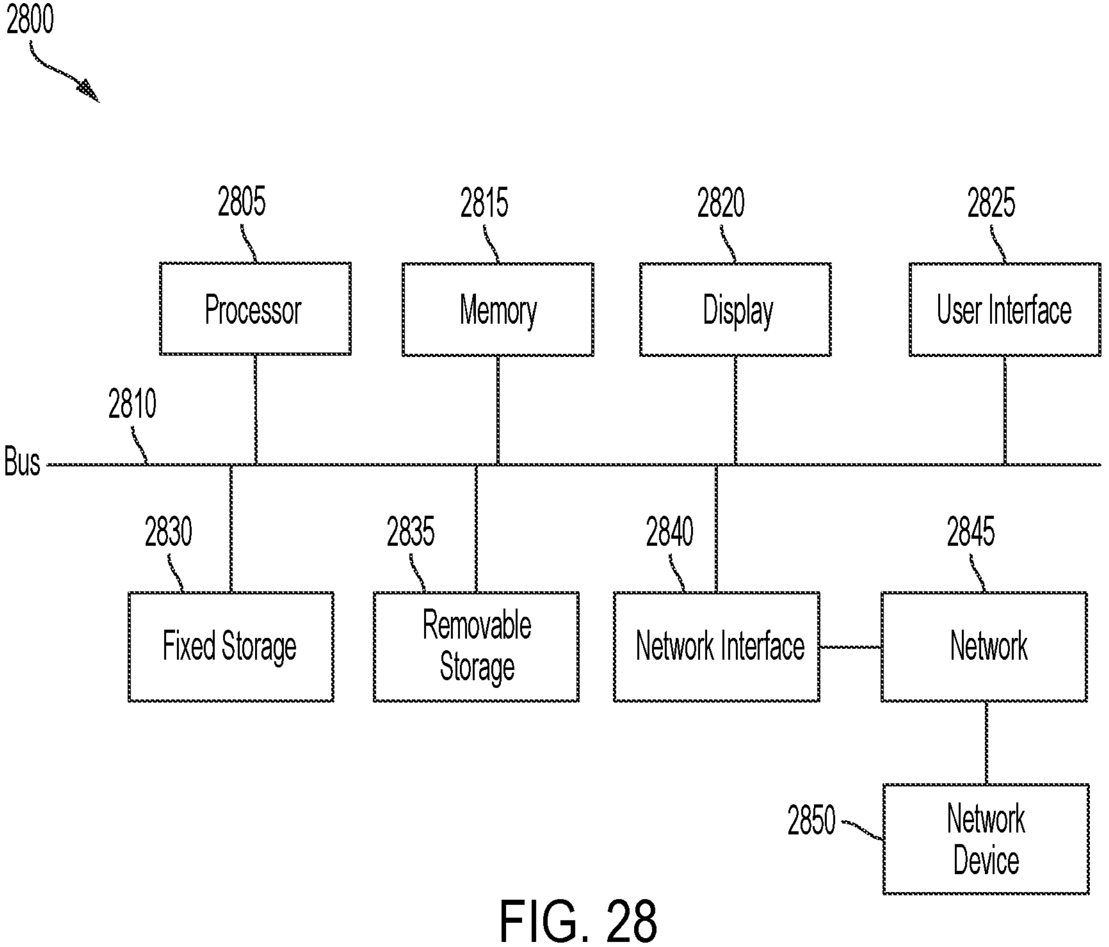
FIG. 28 depicts an example computing device suitable for implementing examples of the disclosed subject matter.

Examples of the disclosed subject matter can be implemented in, and used with, hardware devices, network architectures, the like, and a combination thereof. FIG. 28 illustrates the example computing device 2800 suitable for implementing examples of the disclosed subject matter. In an example, the computing device 2800 can be part of a wireless network base station, a server, a desktop computer, a laptop computer, a mobile device, a special-purpose computer, a non-generic computer, an electronic device described hereby (as is practicable), the like, or a combination thereof.

The computing device 2800 can include a processor 2805, a bus 2810, a memory 2815, a display 2820, a user interface 2825, a fixed storage device 2830, a removable storage device 2835, a network interface 2840, or a combination thereof.

The processor 2805 is a hardware-implemented processing unit configured to control at least a portion of operation of the computing device 2800. The processor 2805 can perform logical and arithmetic operations based on processor-executable instructions stored within the memory 2815. The processor 2805 can be configured to execute instructions which cause the processor 2805 to initiate at least a part of a method described hereby. In an example, the processor 2805 can interpret instructions stored in the memory 2815 to initiate at least a part of a method described hereby. In an example, the processor 2805 can execute instructions stored in the memory 2815 to initiate at least a part of a method described hereby. The instructions, when executed by the processor 2805, can transform the processor 2805 into a special-purpose processor that causes the processor to perform at least a part of a function described hereby. The processor 2805 may also be referred to as a central processing unit (CPU), a special-purpose processor (e.g., a non-generic processor), or both.

The processor 2805 can comprise or be a component of a physical processing system implemented with one or more processors. The processor 2805 can be implemented with at least a portion of: a microprocessor, a microcontroller, a digital signal processor (DSP) integrated circuit, a field programmable gate array (FPGA), a programmable logic device (PLD), an application-specific integrated circuit (ASIC), a controller, a state machine, a gated logic circuit, a discrete hardware component, a dedicated hardware finite state machine, a suitable physical device configured to manipulate information (e.g., calculating, logical operations, the like, or a combination thereof), the like, or a combination thereof.

The bus 2810 couples components of the computing device 2800. The bus 2810 can enable information communication between the processor 2805 and one or more components coupled to the processor 2805. The bus 2810 can include a data bus, a power bus, a control signal bus, a status signal bus, the like, or a combination thereof. In an example, the components of the computing device 2800 can be coupled together to communicate with each other using a different suitable mechanism.

The memory 2815 generally represents any type or form of volatile storage device, non-volatile storage device, medium, the like, or a combination thereof. The memory 2815 is capable of storing data, processor-readable instructions, the like, or a combination thereof. In an example, the memory 2815 can store data, load data, maintain data, or a combination thereof. In an example, the memory 2815 can store processor-readable instructions, load processor-readable instructions, maintain processor-readable instructions, or a combination thereof. The memory 2815 can be a main memory configured to store an operating system, an application program, the like, or a combination thereof. The memory 2815 can be configured to store a basic input-output system (BIOS) which can control basic hardware operation such as interaction of the processor 2805 with peripheral components. The memory 2815 can also include a non-transitory machine-readable medium configured to store software. Software can mean any type of instructions, whether referred to as at least one of software, firmware, middleware, microcode, hardware description language, the like, or a combination thereof. Processor-readable instructions can include code (e.g., in source code format, in binary code format, executable code format, or in any other suitable code format).

The memory 2815 can include at least one of read-only memory (ROM), random access memory (RAM), a flash memory, a cache memory, an erasable programmable read-only memory (EPROM), an electrically erasable programmable read-only memory (EEPROM), a register, a hard disk drive (HDD), a solid-state drive (SSD), an optical disk drive, other memory, the like, or a combination thereof which is configured to store information (e.g., data, processor-readable instructions, software, the like, or a combination thereof) and is configured to provide the information to the processor 2805.

The display 2820 can include a component configured to visually convey information to a user of the computing device 2800. In examples, the display 2820 is a display screen, such as a light-emitting diode (LED) screen.

The user interface 2825 can include user devices such as a switch, a keypad, a touch screen, a microphone, a speaker, an audio reproduction device, a jack for coupling the computing device to an audio reproduction device, the like, or a combination thereof. The user interface 2825 can optionally include a user interface controller. The user interface 2825 can include a component configured to convey information to a user of the computing device 2800, a component configured to receive information from the user of the computing device 2800, or both.

The fixed storage device 2830 can include one or more hard drive, flash storage device, the like, or a combination thereof. The fixed storage device 2830 can be an information storage device which is not configured to be removed during use. The fixed storage device 2830 can optionally include a fixed storage device controller. The fixed storage device 2830 can be integral with the computing device 2800 or can be separate and accessed through an interface.

The removable storage device 2835 can be integral with the computing device 2800 or can be separate and accessed through other interfaces. The removable storage device 2835 can be an information storage device which is configured to be removed during use, such as a memory card, a jump drive, a flash storage device, an optical disk, the like, or a combination thereof. The removable storage device 2835 can optionally include a removable storage device controller. The removable storage device 2835 can be integral with the computing device 2800 or can be separate and accessed through an interface.

Non-transient processor-executable instructions (e.g., computer-readable instructions, controller-readable instructions, or both) configured to cause a processor to implement at least an aspect of the present disclosure can be stored on a computer-readable storage medium such as one or more of the memory 2815, the fixed storage device 2830, the removable storage device 2835, a remote storage location, the like, or a combination thereof.

The network interface 2840 can couple the computing device 2800 to a network 2845 and enable exchanging information between the computing device 2800 and the network 2845. For example, the network interface 2840 can enable the computing device 2800 to communicate with one or more other network devices 2850. The network interface 2840 can couple to the network 2845 using any suitable technique and any suitable protocol. Example techniques and protocols the network interface 2840 can be configured to implement include digital cellular telephone, Low Power Wide-Area Wireless Network modulation techniques, Long Range Radio (LoRa), WiFi™, Bluetooth®, near-field communications (NFC), the like, or a combination thereof.

The network 2845 can couple the computing device 2800 to one or more other network devices. The network 2845 can enable exchange of information between the computing device 2800 and the one or more other network devices 2850. The network 2845 can include one or more private networks, local networks, wide-area networks, wireless network nodes, the Internet, other communication networks, the like, or a combination thereof. In an example, the network 2845 is a wired network, a wireless network, an optical network, the like, or a combination thereof.

The one or more other network devices 2850 can store computer-readable instructions configured to cause a processor (e.g., the processor 2805) to initiate performing at least a portion of a method described hereby. The one or more other network devices 2850 can include a server, a storage medium, the like, or a combination thereof. The one or more other network devices 2850 can be one or more wireless network nodes.

All of the components illustrated in FIG. 28 need not be present to practice the present disclosure. Further, the components illustrated in FIG. 28 can be coupled in different ways from those illustrated.

As used hereby, the term "example" means "serving as an example, instance, or illustration." Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like, as practicable. These are several non-limiting and non-exhaustive examples.

The term "signal" can include any signal such as a data signal, an audio signal, a video signal, a multimedia signal, an analog signal, a digital signal, and the like. Information and signals described hereby can be represented using any of a variety of different technologies and techniques. For example, data, an instruction, a process step, a process block, a command, information, a signal, a bit, a symbol, and the like which are referred to hereby can be represented by a voltage, a current, an electromagnetic wave, a magnetic field, a magnetic particle, an optical field, an optical particle, and/or any practical combination thereof, depending at least in part on the particular application, at least in part on the desired design, at least in part on the corresponding technology, and/or at least in part on like factors.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements". For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In other words, the singular portends the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

Those of skill in the art will appreciate the example logical blocks, elements, modules, circuits, and steps described in the examples disclosed hereby can be implemented as electronic hardware, computer software, or combinations of both, as is practicable. To clearly illustrate this interchangeability of hardware and software, example components, blocks, elements, modules, circuits, and steps have been described hereby generally in terms of their functionality. Whether such functionality is implemented as hardware or software depends upon the particular application and design constraints imposed on an overall system. Skilled artisans can implement the described functionality in different ways for each particular application, but such implementation decisions should not be interpreted as causing a departure from the scope of the present disclosure.

At least a portion of the methods, sequences, algorithms or a combination thereof which are described in connection with the examples disclosed hereby can be embodied directly in hardware, in instructions executed by a processor (e.g., a processor described hereby), or in a combination thereof. In an example, a processor includes multiple discrete hardware components. Instructions can reside in a non-transient storage medium (e.g., a memory device), such as a random-access memory (RAM), a flash memory, a read-only memory (ROM), an erasable programmable read-only memory (EPROM), an electrically erasable programmable read-only memory (EEPROM), a register, a hard disk, a removable disk, a compact disc read-only memory (CD-ROM), any other form of storage medium, the like, or a combination thereof. An example storage medium (e.g., a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (e.g., an application specific integrated circuit (ASIC)), by instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a function described hereby. Additionally, a sequence of actions described hereby can be entirely within any form of non-transitory computer-readable storage medium having stored thereby a corresponding set of instructions which, upon execution, configure the processor to create specific logic circuits. Thus, examples may be in a number of different forms, all of which have been contemplated to be within the scope of the disclosure. In addition, for each of the examples described hereby, a corresponding electrical circuit of any such examples may be described hereby as, for example, "a logic circuit configured to" perform a described action.

In an example, when a general-purpose computer (e.g., a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method described hereby. In an example, a combination of two or more related method steps disclosed hereby forms a sufficient algorithm. In an example, a sufficient algorithm constitutes special programming. In an example, special programming constitutes any software which can cause a computer (e.g., a general-purpose computer, a special-purpose computer, etc.) to be configured to perform one or more functions, features, steps algorithms, blocks, or a combination thereof, as disclosed hereby.

At least one example provided hereby can include a non-transitory (i.e., a non-transient) machine-readable medium and/or a non-transitory (i.e., a non-transient) computer-readable medium storing processor-executable instructions configured to cause a processor (e.g., a special-purpose processor) to transform the processor and any other cooperating devices into a machine (e.g., a special-purpose processor) configured to perform at least a part of a function described hereby, at least a part of a method described hereby, the like, or a combination thereof. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (i.e., a non-transient) machine-readable medium specifically excludes a transitory propagating signal. Further, one or more examples can include a computer-readable medium embodying at least a part of a function described hereby, at least a part of a method described hereby, the like, or a combination thereof.

Nothing stated or depicted in this application is intended to dedicate any component, step, block, element, feature, object, benefit, advantage, or equivalent to the public, regardless of whether the component, step, block, element, feature, object, benefit, advantage, or the equivalent is recited in the claims. While this disclosure describes examples, changes and modifications can be made to the examples disclosed hereby without departing from the scope defined by the appended claims. A feature from any of the provided examples can be used in combination with one another feature from any of the provided examples in accordance with the general principles described hereby. The present disclosure is not intended to be limited to the specifically disclosed examples alone.

What is claimed is:

1. A computer-implemented method for recovering collided packets in a wireless network, comprising:

detecting, by a wireless network base station, the collided packets, wherein:

the collided packets were received from respective wireless network nodes;

the collided packets have respective signal vectors;

the respective signal vectors have respective peaks that are interleaved as a result of the collision; and the collided packets comprise respective contiguous symbols having respective symbol boundaries;

calculating respective estimated symbol boundaries of the collided packets;

identifying respective carrier frequency offsets (CFO) of the collided packets;

adjusting the respective signal vectors of the collided packets by:

aligning the collided packets in time to the respective estimated symbol boundaries; and correcting the respective CFOs of the collided packets to respective estimated CFOs;

finding peaks in combined signal vectors of the collided packets; and assigning, by the wireless network base station, a specific peak found in the respective peaks of the adjusted signal vectors to a respective specific packet in the collided packets, wherein the assigning comprises:

calculating a matching cost, per-collided packet, from an amplitude of the specific peak and a time when the specific peak occurred, wherein the matching cost is determined from a combination of per-collided packet parameters comprising:

respective estimated symbol boundaries of the collided packets;

the respective estimated CFOs of the collided packets; and a peak amplitude history of prior packets received from the respective wireless network nodes; and assigning, based on a respective specific packet in the collided packets having the parameters producing a lowest matching cost among the calculated matching costs, the specific peak to the respective specific packet.

2. The method of claim 1, further comprising iteratively performing the assigning step for peaks in the combined signal vectors of the collided packets to produce recovered packets from the collided packets.

3. The method of claim 2, further comprising decoding, using block-based error correction, a recovered packet in the recovered packets by:

decoding respective physical layer headers of the recovered packets to identify a parameter of respective payloads, wherein the parameter includes a coding rate;

producing, using a default decoder, a cleaned block by replacing each row of a received block in the recovered packet with a codeword having a minimum Hamming distance;

determining a presence of two or more error columns in the received block in the recovered packet by identifying a difference between the received block and the cleaned block; and correcting the two or more error columns by:

masking at least one of the error columns;

generating candidate fixed blocks for combinations of the two or more error columns by replacing each row in the received block with a respective codeword that matches bits in non-masked columns; and performing a packet-level Cyclic Redundancy Check (CRC) on the candidate fixed blocks to identify a correct candidate fixed block, wherein the packet-level CRC identifies the correct candidate fixed block with a CRC pass.

4. The method of claim 3, wherein the block-based error correction is performed following identifying all symbols in a physical layer header of the recovered packet.

5. The method of claim 1, further comprising masking, prior to the assigning step, a known respective peak in the collided packets that is:

in a preamble of a respective collided packet;

known to be in a packet that is correctly decoded; or both.

6. The method of claim 1, further comprising determining the peak amplitude history by measuring a deviation of an amplitude of the specific peak from an expected peak amplitude for a specific wireless network node, wherein the expected peak amplitude for the specific wireless network node is determined by curve-fitting historical data indicating changes to historical peaks for the specific wireless network node.

7. The method of claim 1, wherein the wireless network is a low-power wide area network (LPWAN).

8. A wireless network base station configured to recover collided packets in a wireless network, comprising:

a tangible processor; and a tangible memory comprising processor-executable instructions that, when executed by the tangible processor, cause the tangible processor to:

detect, by the wireless network base station, the collided packets, wherein:

the collided packets were received from respective wireless network nodes;

the collided packets have respective signal vectors;

the respective signal vectors have respective peaks that are interleaved as a result of the collision; and the collided packets comprise respective contiguous symbols having respective symbol boundaries;

calculate respective estimated symbol boundaries of the collided packets;

identify respective carrier frequency offsets (CFO) of the collided packets;

calculate the respective signal vectors of the collided packets by:

aligning the collided packets in time to the respective estimated symbol boundaries; and correcting the respective CFOs of the collided packets to respective estimated CFOs;

find peaks in combined signal vectors of the collided packets; and assign, by the wireless network base station, a specific peak found in the respective peaks of the adjusted signal vectors to a respective specific packet in the collided packets, wherein the assigning comprises:

calculating a matching cost, per-collided packet, from an amplitude of the specific peak and a time when the specific peak occurred, wherein the matching cost is determined from a combination of per-collided packet parameters comprising:

respective estimated symbol boundaries of the collided packets;

the respective estimated CFOs of the collided packets; and a peak amplitude history of prior packets received from the respective wireless network nodes; and assigning, based on a respective specific packet in the collided packets having the parameters producing a lowest matching cost among the calculated matching costs, the specific peak to the respective specific packet.

9. The wireless network base station of claim 8, wherein the processor-executable instructions, when executed by the tangible processor, further cause the tangible processor to iteratively perform the assigning step for peaks in the combined signal vectors of the collided packets to produce recovered packets from the collided packets.

10. The wireless network base station of claim 9, wherein the processor-executable instructions, when executed by the tangible processor, further cause the tangible processor to decode, using block-based error correction, a recovered packet in the recovered packets by:

decoding respective physical layer headers of the recovered packets to identify a parameter of respective payloads, wherein the parameter includes a coding rate;

producing, using a default decoder, a cleaned block by replacing each row of a received block in the recovered packet with a codeword having a minimum Hamming distance;

determining a presence of two or more error columns in the received block in the recovered packet by identifying a difference between the received block and the cleaned block; and correcting the two or more error columns by:

masking at least one of the error columns;

generating candidate fixed blocks for combinations of the two or more error columns by replacing each row in the received block with a respective codeword that matches bits in non-masked columns; and performing a packet-level Cyclic Redundancy Check (CRC) on the candidate fixed blocks to identify a correct candidate fixed block, wherein the packet-level CRC identifies the correct candidate fixed block with a CRC pass.

11. The wireless network base station of claim 10, wherein the block-based error correction is performed following identifying all symbols in a physical layer header of the recovered packet.

12. The wireless network base station of claim 8, wherein the processor-executable instructions, when executed by the tangible processor, further cause the tangible processor to mask, prior to the assigning step, a known respective peak in the collided packets that is:

in a preamble of a respective collided packet;

known to be in a packet that is correctly decoded; or both.

13. The wireless network base station of claim 8, wherein the processor-executable instructions, when executed by the tangible processor, further cause the tangible processor to determine the peak amplitude history by measuring a deviation of an amplitude of the specific peak from an expected peak amplitude for a specific wireless network node, wherein the expected peak amplitude for the specific wireless network node is determined by curve-fitting historical data indicating changes to historical peaks for the specific wireless network node.

14. The wireless network base station of claim 8, wherein the wireless network is a low-power wide area network (LPWAN).

15. A non-transitory computer-readable medium, comprising processor-executable instructions stored thereon configured to cause a processor to:

detect, by a wireless network base station, collided packets, wherein:

the collided packets were received from respective wireless network nodes;

the collided packets have respective signal vectors;

the respective signal vectors have respective peaks that are interleaved as a result of the collision; and the collided packets comprise respective contiguous symbols having respective symbol boundaries;

calculate respective estimated symbol boundaries of the collided packets;

identify respective carrier frequency offsets (CFO) of the collided packets;

calculate the respective signal vectors of the collided packets by:

aligning the collided packets in time to the respective estimated symbol boundaries; and correcting the respective CFOs of the collided packets to respective estimated CFOs;

find peaks in combined signal vectors of the collided packets; and assign, by the wireless network base station, a specific peak found in the respective peaks of the adjusted signal vectors to a respective specific packet in the collided packets, wherein the assigning comprises:

calculating a matching cost, per-collided packet, from an amplitude of the specific peak and a time when the specific peak occurred, wherein the matching cost is determined from a combination of per-collided packet parameters comprising:

respective estimated symbol boundaries of the collided packets;

the respective estimated CFOs of the collided packets; and a peak amplitude history of prior packets received from the respective wireless network nodes; and assigning, based on a respective specific packet in the collided packets having the parameters producing a lowest matching cost among the calculated matching costs, the specific peak to the respective specific packet.

16. The non-transitory computer-readable medium of claim 15, wherein the processor-executable instructions are further configured to cause the processor to iteratively perform the assigning step for peaks in the combined signal vectors of the collided packets to produce recovered packets from the collided packets.

17. The non-transitory computer-readable medium of claim 16, wherein the processor-executable instructions are further configured to cause the processor to decode, using block-based error correction, a recovered packet in the recovered packets by:

decoding respective physical layer headers of the recovered packets to identify a parameter of respective payloads, wherein the parameter includes a coding rate;

producing, using a default decoder, a cleaned block by replacing each row of a received block in the recovered packet with a codeword having a minimum Hamming distance;

determining a presence of two or more error columns in the received block in the recovered packet by identifying a difference between the received block and the cleaned block; and correcting the two or more error columns by:

masking at least one of the error columns;

generating candidate fixed blocks for combinations of the two or more error columns by replacing each row in the received block with a respective codeword that matches bits in non-masked columns; and performing a packet-level Cyclic Redundancy Check (CRC) on the candidate fixed blocks to identify a correct candidate fixed block, wherein the packet-level CRC identifies the correct candidate fixed block with a CRC pass.

18. The non-transitory computer-readable medium of claim 17, wherein the block-based error correction is performed following identifying all symbols in a physical layer header of the recovered packet.

19. The non-transitory computer-readable medium of claim 15, wherein the processor-executable instructions are further configured to cause the processor to mask, prior to the assigning step, a known respective peak in the collided packets that is:

in a preamble of a respective collided packet;

known to be in a packet that is correctly decoded; or both.

20. The non-transitory computer-readable medium of claim 15, wherein the processor-executable instructions are further configured to cause the processor to determine the peak amplitude history by measuring a deviation of an amplitude of the specific peak from an expected peak amplitude for a specific wireless network node, wherein the expected peak amplitude for the specific wireless network node is determined by curve-fitting historical data indicating changes to historical peaks for the specific wireless network node.

* * * * *